(12) United States Patent
Zhang et al.

(10) Patent No.: US 11,837,195 B2
(45) Date of Patent: Dec. 5, 2023

(54) APPARATUS AND METHOD FOR COMMAND STREAM OPTIMIZATION AND ENHANCEMENT

(71) Applicant: Huawei Technologies Co., Ltd., Shenzhen (CN)

(72) Inventors: Fan Zhang, Sammamish, WA (US); Xiaoxing Zhu, Bellevue, WA (US); Arturo Caballero, Seattle, WA (US); Gustavo Nunes, Kirkland, WA (US); Aurelien Chanot, Bellevue, WA (US)

(73) Assignee: Huawei Technologies Co., Ltd., Shenzhen (CN)

( * ) Notice: Subject to any disclaimer, the term of this patent is extended or adjusted under 35 U.S.C. 154(b) by 510 days.

(21) Appl. No.: 17/095,546

(22) Filed: Nov. 11, 2020

(65) Prior Publication Data
US 2021/0065657 A1    Mar. 4, 2021

Related U.S. Application Data

(63) Continuation of application No. PCT/CN2019/089514, filed on May 31, 2019.
(Continued)

(51) Int. Cl.
*G09G 5/36* (2006.01)
*A63F 13/537* (2014.01)
(Continued)

(52) U.S. Cl.
CPC ........... *G09G 5/363* (2013.01); *A63F 13/537* (2014.09); *G06F 1/28* (2013.01); *G06F 9/4843* (2013.01); *G06T 1/20* (2013.01); *G06T 1/60* (2013.01)

(58) Field of Classification Search
CPC . G09G 5/363; A63F 13/537; A63F 2300/203; G06F 1/28; G06F 9/4843; G06T 1/20; G06T 1/60
(Continued)

(56) References Cited

U.S. PATENT DOCUMENTS

| 7,796,130 B2* | 9/2010 | Bakalash | G09G 5/363 345/519 |
| 8,368,705 B2* | 2/2013 | Green | G06T 15/005 345/522 |

(Continued)

FOREIGN PATENT DOCUMENTS

| CN | 103455356 A | 12/2013 |
| CN | 103942823 A | 7/2014 |

(Continued)

OTHER PUBLICATIONS

"Multi thread rendering engine—General and Gameplay Programming—GameDev.net," Sep. 2016, XP055805771, URL:https://gamedev.net/forums/topic/681913-multi-threadrendering-engine/5311276/, 4 pages.
(Continued)

*Primary Examiner* — Allen Chan
(74) *Attorney, Agent, or Firm* — Conley Rose, P.C.

(57) ABSTRACT

A method implemented by a computing device comprises determining, by an original thread executing at a computing device, a command used to render a frame of a graphics application, the command being a call to a graphics interface, constructing, by the original thread executing at the computing device, a command stream based on the command, the command stream comprising a plurality of commands used to render the frame, and executing, by a com- (Continued)

mand stream thread executing at the computing device, the command stream to render the frame of the graphics application.

20 Claims, 16 Drawing Sheets

Related U.S. Application Data

(60) Provisional application No. 62/722,542, filed on Aug. 24, 2018, provisional application No. 62/678,726, filed on May 31, 2018.

(51) Int. Cl.
*G06F 1/28* (2006.01)
*G06F 9/48* (2006.01)
*G06T 1/20* (2006.01)
*G06T 1/60* (2006.01)

(58) Field of Classification Search
USPC .......................................................... 463/31
See application file for complete search history.

(56) References Cited

U.S. PATENT DOCUMENTS

| 8,527,329 | B2* | 9/2013 | Chaar ..................... G06Q 10/06 |
| | | | 705/7.42 |
| 9,342,857 | B2 | 5/2016 | Kubisch et al. |
| 9,760,967 | B2 | 9/2017 | Shah et al. |
| 10,430,915 | B2* | 10/2019 | Khodakovsky ......... G06T 15/30 |
| 2009/0079763 | A1 | 3/2009 | Takeichi |
| 2010/0118039 | A1 | 5/2010 | Labour |
| 2011/0210982 | A1* | 9/2011 | Sylvan .................. G06F 9/5038 |
| | | | 345/629 |
| 2012/0081378 | A1 | 4/2012 | Roy et al. |
| 2014/0184623 | A1 | 7/2014 | Frascati et al. |
| 2014/0333641 | A1* | 11/2014 | Dodge ..................... G06T 9/00 |
| | | | 345/522 |
| 2015/0302546 | A1 | 10/2015 | Balci et al. |
| 2017/0061568 | A1 | 3/2017 | Metz et al. |

FOREIGN PATENT DOCUMENTS

| CN | 104102488 A | 10/2014 |
| CN | 105631921 A | 6/2016 |
| CN | 105741227 A | 7/2016 |
| CN | 106455356 A | 2/2017 |
| KR | 20160148594 A | 12/2016 |

OTHER PUBLICATIONS

Pinheiro, R., et al., "Introduction to Multithreaded rendering and the usage of Deferred Contexts in DirectX 11," SBC Proceedings of SBGames, Tutorials Track—Computing, Nov. 2011, 5 pages.

Hu, C., Research and Implementation of 3D Game Engine, May 2011, with an English Abstract, total 57 pages.

* cited by examiner

APPARATUS AND METHOD FOR COMMAND STREAM OPTIMIZATION AND ENHANCEMENT

CROSS-REFERENCE TO RELATED APPLICATIONS

The present application is a continuation of International Patent Application PCT/CN2019/089514, filed May 31, 2019, by Huawei Technologies Co., Ltd., and claims the benefit of U.S. Provisional Patent Application No. 62/722,542, filed Aug. 24, 2018, by Fan Zhang, et. al., and entitled "Apparatus and Method for Command Stream Optimization and Enhancement," and U.S. Provisional Patent Application No. 62/678,726, filed May 31, 2018, by Fan Zhang, et. al., and entitled "Command Stream Dynamic Reconstruction based Graphics Optimization and Enhancement," all of which are incorporated herein by reference as if reproduced in their entirety.

FIELD OF INVENTION

The present disclosure pertains to the field of computer graphics processing and rendering. In particular, the present disclosure relates to improving a performance and a power consumption of a computing device for rendering graphics.

BACKGROUND

The most frequently downloaded applications from application marketplaces are video game applications. Video game applications are also a top revenue source for the application marketplaces. Based on market research data, video game applications contribute almost 80 percent (%) of the overall annual application marketplace revenue. In addition, over 50% of mobile phone users spend more than one hour using gaming applications on average every day.

Therefore, the overall user experience that revolves around playing a video game on a mobile device influences how users determine which phones provide the best quality video games and which video game applications to purchase from the marketplace. The overall user experience may include various factors such as a performance of the video game, a power consumption that occurs while playing the video game, heat released by the mobile device while playing the video game, audio quality of the video game, etc. Of these factors, the performance of the video game, which may refer to a frame rate of the video game, and a power consumption of the video game are the most significant factors that affect the overall user experience when playing a video game.

SUMMARY

According to a first aspect of the present disclosure, there is provided a method implemented by a computing device. The method comprises determining, by an original thread executing at a computing device, a command used to render a frame of a graphics application, the command being a call to a graphics interface, constructing, by the original thread executing at the computing device, a command stream based on the command, the command stream comprising a plurality of commands used to render the frame, and executing, by a command stream thread executing at the computing device, the command stream to render the frame of the graphics application.

In a first implementation of the method according to the first aspect as such, the command stream is executed by the command stream thread simultaneously with rendering logic executed by the original thread.

In a second implementation of the method according to the first aspect as such or any preceding implementation of the first aspect, constructing the command stream comprises extracting, by the computing device, the plurality of commands from the rendering logic, and combining, by the computing device, plurality of commands extracted from the rendering logic.

In a third implementation of the method according to the first aspect as such or any preceding implementation of the first aspect, execution of the command stream by the command stream thread is interleaved with an execution of a game logic update and a rendering logic by the original thread.

In a fourth implementation of the method according to the first aspect as such or any preceding implementation of the first aspect, comprises reinterpreting, by the computing device, a plurality of graphics interfaces corresponding to the plurality of commands in the command stream, the reinterpreting of the plurality of graphics interfaces being customizable and interchangeable during at least one of compile time or runtime on a per application basis, determining, by the computing device, command stream information comprising graphics data and data dependencies between the plurality of commands in the command stream, and organizing and storing, by the computing device, the command stream information into a command buffer being stored in a memory of the computing device.

In a fifth implementation of the method according to the first aspect as such or any preceding implementation of the first aspect, comprises retrieving, by the command stream thread restoring and executing at the computing device, the command from the command stream by fetching the command from a command buffer, the command buffer comprising at least one memory block.

In a sixth implementation of the method according to the first aspect as such or any preceding implementation of the first aspect, the original thread is executed a first core of the computing device, and wherein the command stream thread is executed at a second core of the computing device.

In a seventh implementation of the method according to the first aspect as such or any preceding implementation of the first aspect, comprises modifying, by the command stream thread or the original thread, at least one of the commands within the command stream before executing the commands.

In an eighth implementation of the method according to the first aspect as such or any preceding implementation of the first aspect, comprises inserting, by at least one of the original thread or the command stream thread, a visual enhancement command to the command stream, the visual enhancement command adding a visual effect to the frame being rendered.

According to second aspect of the present disclosure, there is provided a computing device. The computing device comprises a memory comprising a command buffer, a first processor coupled to the memory, an original thread executing at the first processor being configured to determine a command used to render a frame of a graphics application, the command being a call to a graphics interface, store a command stream at the command buffer, the command stream being constructed based on the command, and the command stream comprising a plurality of commands used to render the frames, and a command stream thread executing at the processor and being configured to execute the command stream to render the frame of the graphics application.

In a first implementation of the computing device according to the second aspect as such, the command is executed by the command stream thread simultaneously with rendering logic executed by the original thread, and wherein the original thread is further configured to determine a threshold for the frame that defines a minimum number of commands that are stored in the command buffer before the command stream thread begins execution of the plurality of commands in the command stream, and execute the plurality of commands in the command stream when the number of commands stored in the command buffer meets the threshold.

In a second implementation of the computing device according to the second aspect as such or any preceding implementation of the second aspect, the command stream is interleaved with an execution of a game logic update and a rendering logic.

In a third implementation of the computing device according to the second aspect as such or any preceding implementation of the second aspect, the threshold for the frame is adjusted based on a number of commands in the command stream for a previous frame of the graphics application and an execution timing of the commands in the command stream relative to the original thread.

In a fourth implementation of the computing device according to the second aspect as such or any preceding implementation of the second aspect, the command buffer is partitioned into a plurality of memory blocks, a first memory block storing a handle for the command and a parameter for the command, the second memory block storing graphics data used by the command for rendering the frame.

In a fifth implementation of the computing device according to the second aspect as such or any preceding implementation of the second aspect, the command buffer comprises a memory address of the command, wherein a plurality of implementations may be stored for the command, and wherein one of the implementations may be selected for execution by the command stream thread.

In a sixth implementation of the computing device according to the second aspect as such or any preceding implementation of the second aspect, the command stream comprises a plurality of commands, and wherein the original thread is further configured to reconstruct one or more of the plurality commands within the command stream before executing the commands by changing the parameters of the command or removing a redundant command.

In a seventh implementation of the computing device according to the second aspect as such or any preceding implementation of the second aspect, the original thread is configured to construct the command stream by extracting the plurality of commands from the rendering logic, and combining the plurality of commands extracted from the rendering logic.

In an eighth implementation of the computing device according to the second aspect as such or any preceding implementation of the second aspect, the original thread is further configured to determine whether to initiate the command stream thread based on at least one of a user command or a configuration file.

According to third aspect of the present disclosure, there is provided a computing device. The computing device comprises an original thread executed at the computing device being configured to determine a command used to render a frame of a graphics application, the command being a call to a graphics interface, construct a command stream based on the command, the command stream comprising a plurality of commands used to render the frame, and a command stream thread executing at the computing device being configured to execute the command stream to render the frame of the graphics application.

In a first implementation of the computing device according to the third aspect as such, the original thread is further configured to pre-emptively modify the command stream to generate a large pool of handles that are subsequently used by the original thread to execute relevant subsequent commands in an asynchronous manner.

In a second implementation of the computing device according to the third aspect as such or any preceding implementation of the third aspect, the plurality of commands in the command stream includes one or more synchronous commands that are correlated with one another, and wherein the original thread is further configured to execute a plurality of synchronous commands together at one time.

In a third implementation of the computing device according to the third aspect as such or any preceding implementation of the third aspect, the original thread is further configured to store the command into a command buffer of a memory of the computing device.

In a fourth implementation of the computing device according to the third aspect as such or any preceding implementation of the third aspect, the command buffer comprises a memory address of the command.

In a fifth implementation of the computing device according to the third aspect as such or any preceding implementation of the third aspect, the original thread is configured to construct the command stream by extracting the plurality of commands from the rendering logic, and combining the plurality of commands extracted from the rendering logic.

In a sixth implementation of the computing device according to the third aspect as such or any preceding implementation of the third aspect, the computing device further comprising a processor further configured to initiate the command stream thread based on at least one of a user command, a configuration file, or detection logic, and terminate the command stream thread based on at least one of a user command, a configuration file, or detection logic.

In a seventh implementation of the computing device according to the third aspect as such or any preceding implementation of the third aspect, each of the plurality of commands comprises a call to an OPEN GRAPHICS LIBRARY (OPEN GL) Application Programming Interface (API) or an OPEN GL EMBEDDED SYSTEMS (ES) API.

In an eighth implementation of the computing device according to the third aspect as such or any preceding implementation of the third aspect, each of the plurality of commands comprises a call to an interface implemented at a game layer of the computing device.

In a ninth implementation of the computing device according to the third aspect as such or any preceding implementation of the third aspect, each of the plurality of commands comprises a call to an interface implemented at a device driver of the computing device.

The embodiments disclosed herein enable the graphics applications to execute at computing devices with an increased frame rate, thereby enhancing the user experience while navigating the graphics applications. Typically, increasing the frame rate of a graphics application also leads to an increase in the power consumed by the computing device, which also increased the heat released from the computing while the user is navigating the graphics applications. The embodiments disclosed herein enable an increased frame rate for a graphics application without leading to an increased power consumption.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1A:
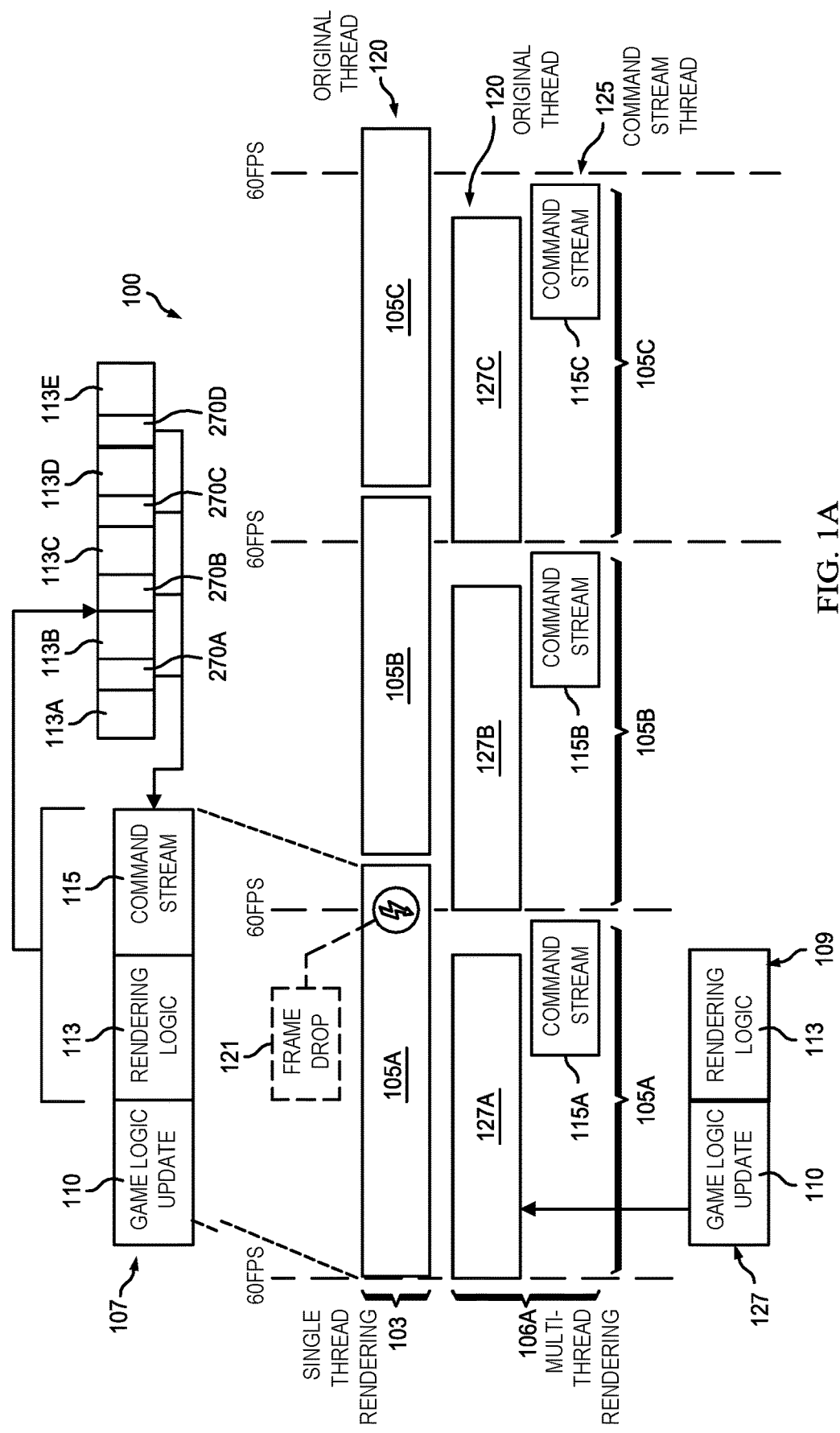
FIGS. 1A-B is a diagram illustrating command stream optimization and enhancement according to various embodiments of the disclosure.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

A standard graphics application, such as a video game, consists of still images that are rendered consecutively and played back in quick succession according to user controls. A frame refers to a single one of these images, and the frame rate refers to how often the video game is updated to display a new frame. The frame rate may reflect how often an image seen on a screen of a computing device is refreshed to produce a new frame with simulation, movement, and/or motion. The frame rate is most often measured in frames per second (FPS). When a user is playing a video game, a low frame rate may often appear to the user as a graphical lag.

The video game industry standards for frame rate, resolution, and complexity of graphics displayed by the frame is increasing rapidly. Currently, the industry standard frame rate for a video game is about 30 FPS. However, the industry standard frame rate is quickly moving toward 60 FPS. Similarly, the industry standard for video game screen resolution has been shifting from 720 pixels to 1080 pixels to provide a better image quality.

However, increasing the frame rate, resolution, and complexity of the graphics displayed in the frames of a video game also increases the computation cost that causes a frame to drop and de-stabilize and power consumption of the computing device rendering the video game. That is, users typically sacrifice the battery life of their computing devices (e.g. mobile device) when playing video games having a higher frame rate and resolution. This increased power consumption may also lead to an undesirable increase in the heat released from the mobile device.

Disclosed herein are systems and methods for optimizing and enhancing the rendering of frames for graphics applications, such as a video game application, to increase a frame rate of the game while reducing the power consumed by the computing device. In an embodiment, the rendering of a frame of a video game may be divided and executed by least two different threads that may be respectively executing on different cores of the computing device. In an embodiment, a command stream may be executed on a command stream thread while the game logic updates and the rendering logic may continue to be executed on an original thread. The command stream comprises one or more commands, or calls to one or more graphical Application Programming Interfaces (APIS), that are used to render the objects and aspects for the frame. In an embodiment, the commands within the command stream may be modified to optimize the frame rate of the video game. In an embodiment, visual enhancements or effects may be additionally added to the command stream to optimize the resolution or quality of the frame being rendered.

Figure 1B:
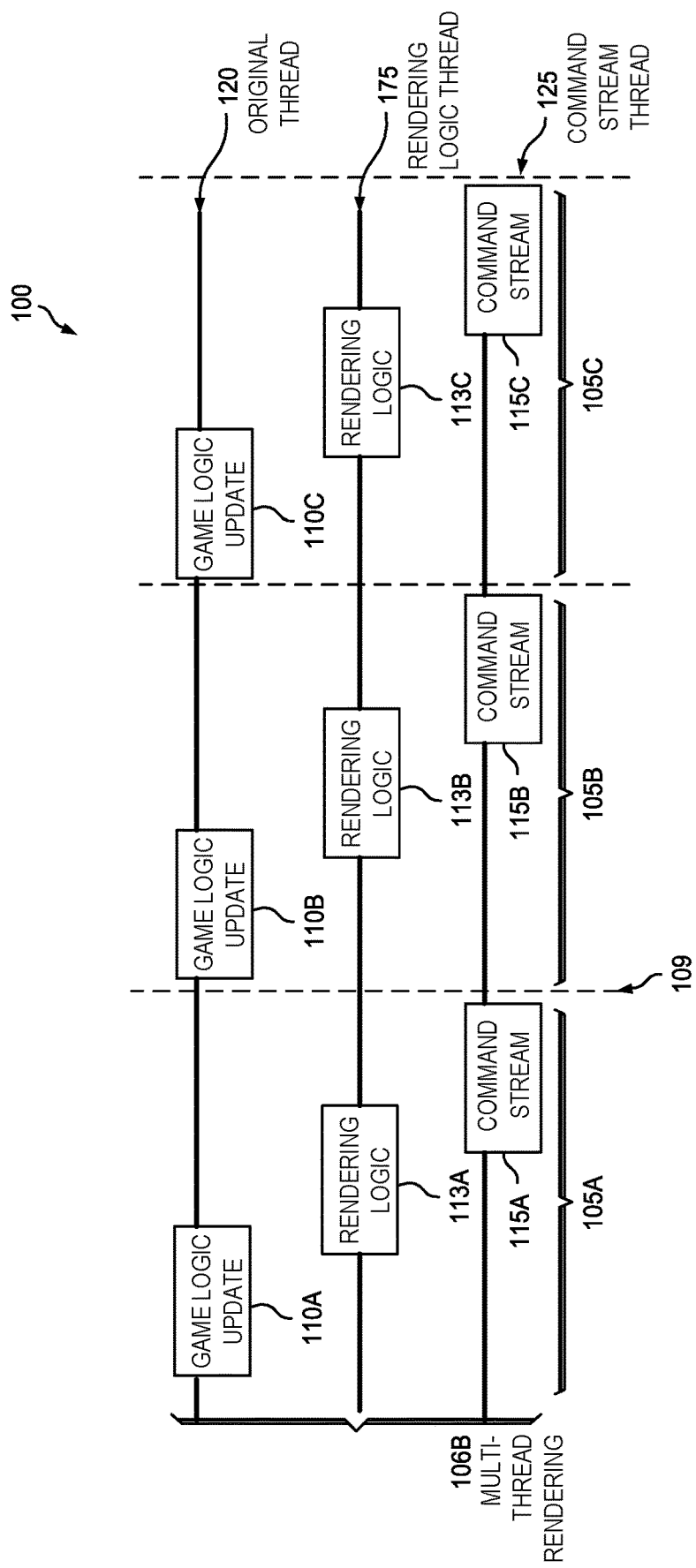

FIGS. 1A-B are diagrams 100A and 100B illustrating command stream optimization and enhancement according to various embodiments of the disclosure. In particular, FIGS. 1A-B show examples of rendering frames 105A-C of a video game using single-thread rendering 103, and an example of rendering frames 105A-C of a video game using multi-thread rendering 106A-B. Single-thread rendering 103 refers to the processing and rendering each of the frames 105A-C of a video game using a single thread executing on a single core of a computing device. A core of a computing device refers to computing component or processing unit of the computing device. Additional components of the computing device will be further described below with respect to FIGS. 2-3. Multi-thread rendering 106A-B refers to the processing and rendering of each of the frames 105A-C of the video game using multiple threads executing on multiple cores of the computing device.

The processing and rendering of a frame 105A-C typically includes frame logic 107 that may be categorized into three different types of logic: game logic updates 110, rendering logic 113, and a command stream 115. The game logic updates 110 refer to the logic or software components that are used to describe the simulation of the game for that particular frame 105A-C. The game logic updates 110 may determine components of the frame 105A-C, such as the locations of the objects within the frame 105A-C that are being processed and rendered, characters displayed in the frame, tools used by the characters, setting objects, etc. The game logic updates 110 may also include the relationship or proxies between the components of the frame 105A-C, such as a relationship between objects displayed the on frame 105A-C being processed and rendered.

Based on the simulation results of the game logic updates 110, a rendering engine may be used to perform the actual rendering of the frame 105A-C, which may be performed using the rendering logic 113 and the command steam 115. The rendering engine is software that draws texts and images on the screen of a computing device. Examples of existing rendering engines include UNITY, UNREAL ENGINE, COCOS, OGRE, etc. As should be appreciated, any rendering engine may be used to process and execute the rendering logic 113 and the command stream 115 to render the frame 105A-C for the video game.

The rendering engine may include or maintain standard rendering logic 113 that is used to render objects and aspects displayed on different frames 105A-C of a video game. The rendering engine may also determine commands that may be called and used to render the one or more components of the frame 105A-C. In an embodiment, the commands may refer to the graphical APIs that the rendering engine selects to call based on the components identified by the game logic updates 110. The command stream 115 refers to a collection of the commands determined by the rendering engine that may be used to render the frame 105A-C. The command stream 115 may thus include a sequence of commands, or calls to graphics interfaces, that are called to render the components of the frame 105A-C. The sequence of the commands in the command stream 115 may be maintained in the particular order as determined by the rendering engine based on dependency relationships between the components of the frame 105A-C.

While the command stream 115 and the rendering logic 113 are shown separately in FIG. 1A, the command stream 115 and the rendering logic 113 may be interleaved. As shown in FIG. 1, the rendering logic 113 may comprise a plurality of rendering logic 113A-E, which is interleaved with the commands 270A-D. In an embodiment, constructing the command stream 115 comprises extracting the commands 270A-D from the rendering logic 113A-E, as further described below with reference to FIG. 5. While FIG. 1A only shows five portions rendering logic 113A-E and four commands 270A-D, it should be appreciated that the logic 107 may comprise any number of portions of rendering logic 113 and commands 270.

After determining the game logic updates 110, the rendering logic 113, and the commands stream 115 for a frame 105A-C, Graphical Processing Unit (GPU) commands may be constructed and then subsequently sent to the GPU to perform the actual hardware rendering of the frame 105A-C. Commands 270, as described above, are calls to graphics APIs, and GPU commands are assembly language instructions that correspond to the functions of the commands 270 and are executed by the GPU. The operations of the GPU will be further described below with reference to FIG. 4.

When a computing device uses single-thread rendering 103, the processing and rendering of the frames 105A-C, which involves executing the game logic updates 110, the rendering logic 113, and the commands stream 115 for each of the frames 105A-C, is typically executed by a single thread (referred to herein as the original thread 120) executing on a single core of the computing device. However, as shown by FIG. 1A, single-thread rendering 103 typically renders a frame 105A-C at a frame rate lower than an industry standard frame rate 109 of 60 FPS. In some cases when a video game or a computing device requires frames 105A-C to be rendered at a higher frame rate of 60 FPS, the frames 105A-C may be dropped before the frames 105A-C are even displayed by the computing device, as shown at box 121. In graphics, when a frame 105A-C is dropped, the rendering of that frame 105 is deferred to a later time, which causes the average frame rate to drop.

The embodiments disclosed herein are directed to multi-thread rendering 106A-B, which renders frames 105A-C at a frame rate closer to the industry standard frame rate 109 of 60 FPS. As shown by FIG. 1A, multi-thread rendering 106A involves determining the commands, or graphical API calls, that should be executed to render the frame 105A-C based on the frame logic 107 to create the command stream 115. The command stream 115 may be transferred to a separate thread (referred to herein as the command stream thread 125) running on a separate core of the computing device such that the command stream thread 125 executes the command stream 115. In this way, the original thread 120 may execute the game and rendering logic 127, which includes the game logic updates 110 and the rendering logic 113, while the command stream thread 125 executes the command stream 115 in parallel.

As shown by FIG. 1A, frame 105A may be generated by executing the frame logic 107, which may be divided into the game and rendering logic 127A and the command stream 115A. The game and rendering logic 127A includes the game logic update 110 and the rendering logic 113 used for rendering frame 105A. The game and rendering logic 127A may remain to be executed by the original thread 120, while the command stream 115A is transferred to the command stream thread 125 to be executed by the command stream thread 125. Similarly, frame 105B may be divided into the game and rendering logic 127B and the command stream 115B. The game and rendering logic 127B may remain executed by the original thread 120, while the command stream 115B is transferred to the command stream thread 125 to be executed by the command stream thread 125. Frame 105C may similarly be divided into the game and rendering logic 127C and the command stream 115C. The game and rendering logic 127C may remain to be executed by the original thread 120, while the command stream 115C is transferred to the command stream thread 125 to be executed by the command stream thread 125.

FIG. 1B shows an embodiment of multi-thread rendering 106B, which is similar to multi-thread rendering 106A, except that multi-thread rendering 106B involves splitting the frame logic 107 to run on three separate threads (e.g., original thread 120, rendering logic thread 175, and command stream thread 125) instead of just two threads. As shown by FIG. 1B, multi-thread rendering 106A involves determining the rendering logic 113 and the command stream 115 that should be executed to render the frame 105A-C frame based on the frame logic 107. In an embodiment, the original thread 120 determines the rendering logic 113 and the commands for the command stream 115. The rendering logic 113 may be transferred to the rendering logic thread 175 running on a separate core of the computing device such that the rendering logic thread 175 executes the rendering logic. Similarly, the command stream 115 may be transferring to the command stream thread 125, which is also executing on a third core of the computing device, such that the command stream thread 125 executes the command stream 115. In this way, each of the original thread 120, rendering logic thread 175, and command stream thread 125 may execute the game logic update 110, rendering logic 113, and command stream 115 in parallel instead of sequentially. The parallel execution of the game logic update 110, rendering logic 113, and command stream 115 enables the frame rate of the computing device rendering the video game to substantially increase.

As shown by FIG. 1B, frame 105A may be generated by executing the frame logic 107, which may be divided into the game logic update 110A, rendering logic 113A, and the command stream 115A. The game logic update 110A may remain to be executed by the original thread 120, while rendering logic 113A is transferring to the rendering logic thread 175 to be executed by the rendering logic thread 175. Similarly, the command stream 115A is transferred to the command stream thread 125 to be executed by the command stream thread 125. Frame 105B may also be divided into the game logic update 110B, rendering logic 113B, and the command stream 115B. The game logic update 110B may remain to be executed by the original thread 120, while rendering logic 113B is transferring to the rendering logic thread 175 to be executed by the rendering logic thread 175. Similarly, the command stream 115B is transferred to the command stream thread 125 to be executed by the command stream thread 125. Frame 105C may similarly be divided into the game logic update 110C, rendering logic 113C, and the command stream 115C. The game logic update 110C may remain to be executed by the original thread 120, while rendering logic 113C is transferring to the rendering logic thread 175 to be executed by the rendering logic thread 175. Similarly, the command stream 115C is transferred to the command stream thread 125 to be executed by the command stream thread 125.

Additional details regarding multi-thread rendering 106A-B is further described below with respect to FIGS. 5-15. The difference between a frame rate produced as a result of single-thread rendering 103 the frames 105A-C and a frame produced as a result of multi-thread rendering 106A-B the same frames 105A-C is shown by FIGS. 1A-B. Specifically, FIG. 1A shows that the parallel execution of the game and rendering logic 127 via the original thread 120 and the command stream 115 via the command stream thread 125 enables the entire frame 105A-C to be processed and rendered at a much higher frame rate. Similarly, FIG. 1B shows that the parallel execution of the game logic update 110 via the original thread 120, the rendering logic 113 via the rendering logic thread 175, and the command stream 115 via the command stream thread 125 also enables the entire frame 105A-C to be processed and rendered at a much faster frame rate.

While FIGS. 1A-B only shows three frames 105A-C, it should be appreciated that a video game may include any number of frames 105A-C. The term frames 105A-C will be referred to hereinafter as frames 105, which may include one or more of the frames for a video game. The term multi-thread rendering 106A-B will hereinafter be referred to as multi-thread rendering 106, which may indicate either multi-thread rendering 106A or multi-thread rendering 106B.

Figure 2:
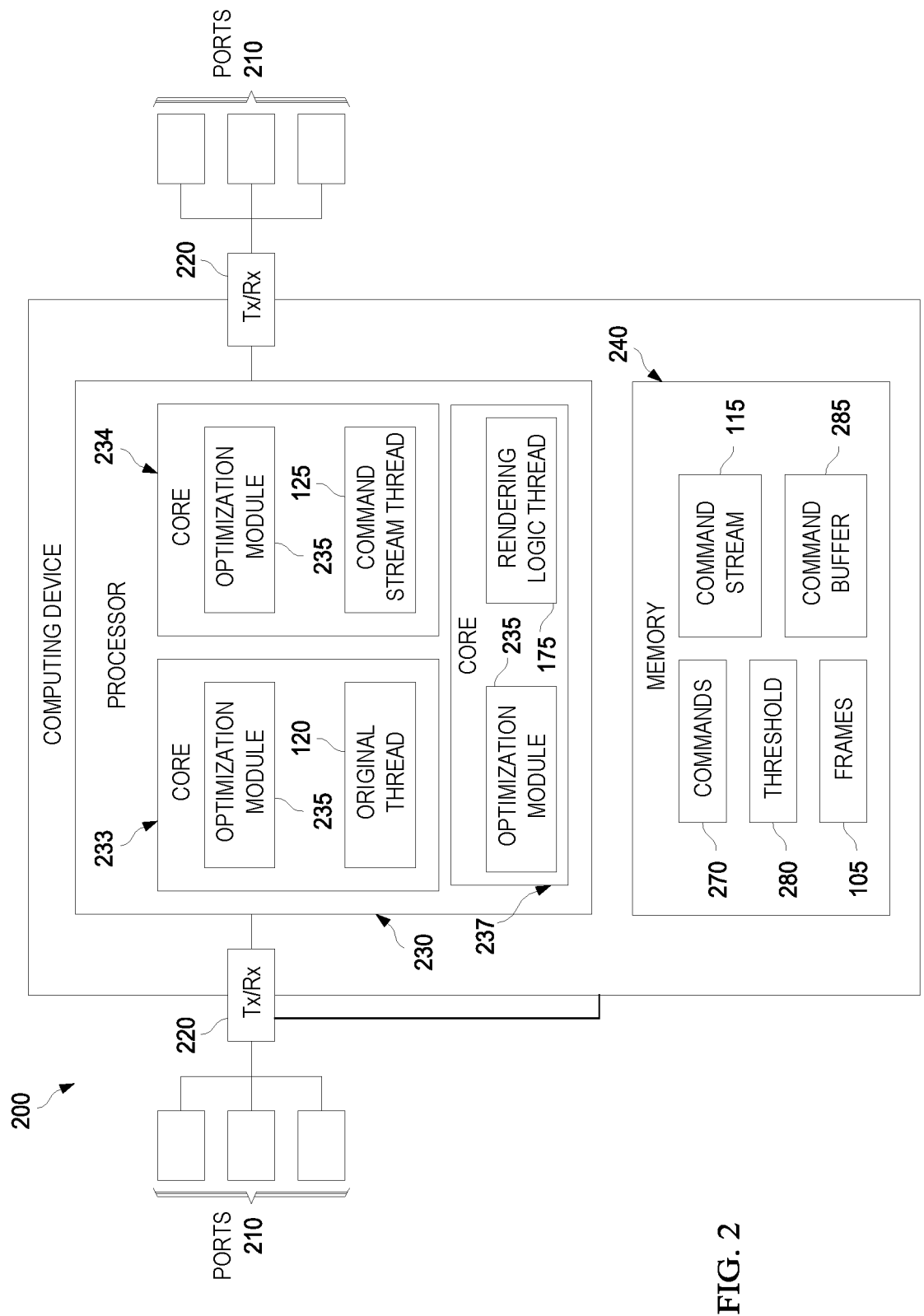
FIG. 2 is a schematic diagram of a computing device suitable for supporting the various embodiments for command stream optimization and enhancement disclosed herein.

FIG. 2 is a schematic diagram of a computing device 200 suitable for supporting the various embodiments for command stream optimization and enhancement disclosed herein. The computing device 200 may be a device, such as a mobile phone, a mobile tablet, a wearable device, a personal computer (PC), a laptop, etc., or other device being able to run graphic applications, such as a video game on behalf of a user.

The computing device 200 comprises ports 210, transceiver units (Tx/Rx) 220, a processor 230, and a memory 240. Ports 210 are endpoints of the computing device 200 through which information is received and sent. In this way, ports 210 are coupled to Tx/Rx 220, and the Tx/Rx 220 may be transmitters, receivers, or combinations thereof. The Tx/Rx 220 may transmit and receive data via the ports 210. Processor 230 is configured to process data. Memory 240 is configured to store data and instructions for implementing embodiments described herein.

The processor 230 may be a multi-core processor comprising two or more cores 233, 234, and 237. The cores 233, 234, and 237 may be integrated onto a single chip multiprocessor or onto a single chip package. The cores 233, 234, and 237 may be independent processing units within the processor 230, which independently read and execute program instructions. The separate cores 233, 234, and 237 may run multiple instructions at the same time, for example, by executing different threads at the same time. A thread of execution refers to a sequence of program instructions that are processed by a first core 233 or second core 234. As shown by FIG. 2, the original thread 120 may be executed by first core 233, the command stream thread 125 is executed by the second core 234, and the rendering logic thread 175 may be executed by the third core 237.

The processor 230 (e.g., each of the cores 233 and 234) is in communication with the ports 210, Tx/Rx 220, and memory 240. The optimization module 235 is implemented by both cores 233 and 234 to execute the instructions for implementing various embodiments discussed herein. For example, the optimization module 235 is configured execute the frame logic 107, in which the original thread 120 may execute the game and rendering logic 127 portion of the frame logic 107, while the command stream thread 125 executes the command stream 115 portion of the frame logic 107.

The memory 240 comprises a double data rate (DDR) and/or a static random-access memory (SRAM). A DDR is an advanced version of a synchronous dynamic random access memory (DRAM), and may be used to carry date between the processor 230 and a graphic processing unit, as will be further described below with reference to FIG. 3. In an embodiment, memory 240 comprises one or more of disks, tape drives, or solid-state drives and may be used as an over-flow data storage device, to store programs when such programs are selected for execution, and to store instructions and data that are read during program execution. The memory 240 may be volatile and non-volatile and may be read-only memory (ROM), random-access memory (RAM), ternary content-addressable memory (TCAM), and static random-access memory (SRAM). Memory 240 may further comprise a cache.

As shown by FIG. 2, the memory 240 comprises the commands 270, the command stream 115, the threshold 280, the command buffer 285, and the frames 105. The command stream 115 and the frames 105 are described above with reference to FIGS. 1A-B. The commands 270 refer to graphics APIs that may be called during the processing and rendering of a frame 105. The command buffer 285 may be the cache of the memory 240 in which commands 270 that are determined for a frame 105 are stored. The threshold 280 is a value corresponding to a minimum number of commands 270 stored at the command buffer 285 before the command stream thread 125 begins executing the command stream 115, which will be further described below with reference to FIG. 12.

Figure 3:
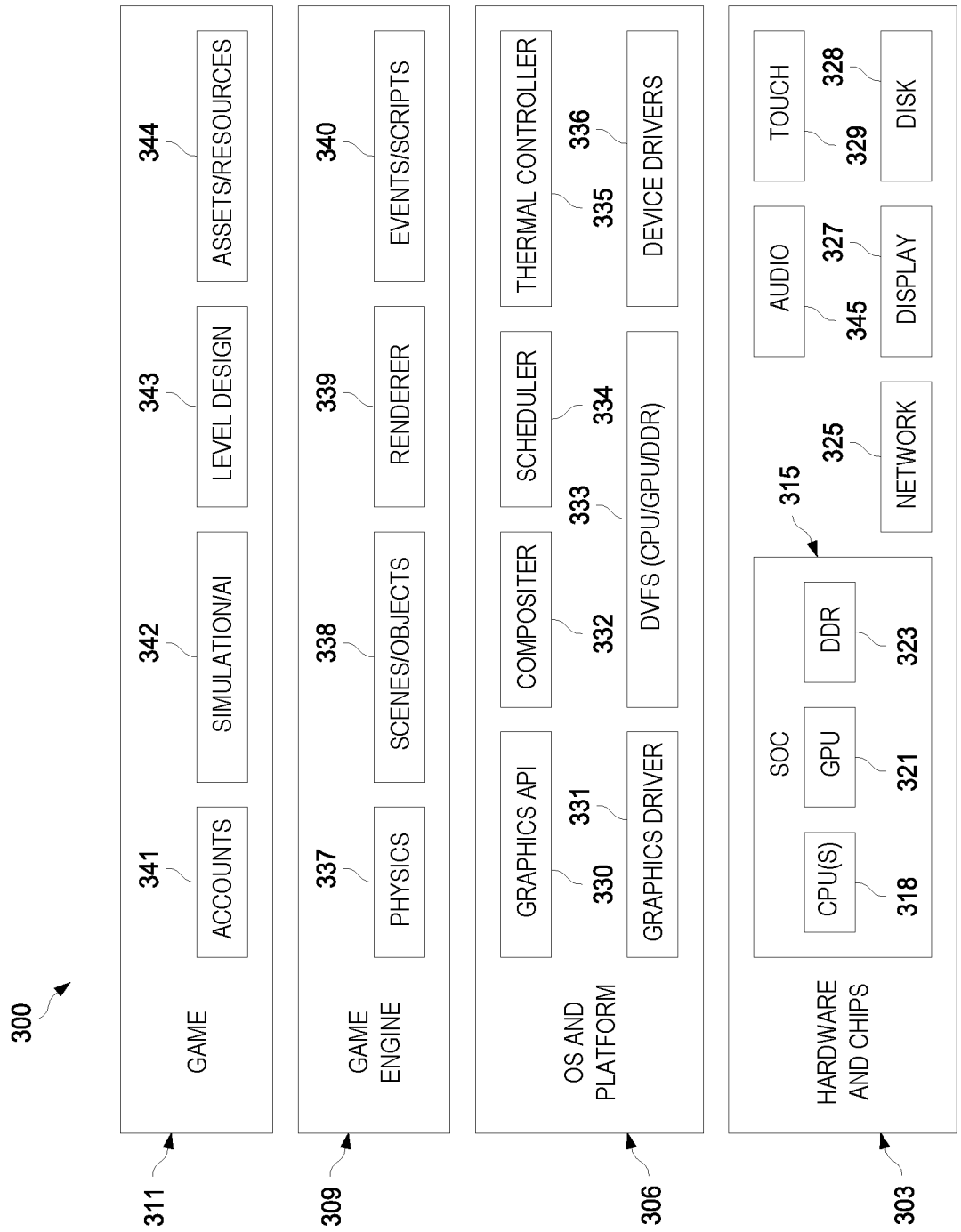
FIG. 3 is another embodiment of a computing device showing various layers that may be used while executing a video game at the computing device.

FIG. 3 is another embodiment of a computing device 300 similar to computing device 200, except that the computing device 300 shown in FIG. 3 shows the layers 303, 306, 309, and 311 that may be used while executing a video game at the computing device 300. The computing device 300 includes a hardware and chips layer 303, an operating system (OS) and platform layer 306, a game engine layer 309, and a game layer 303.

The hardware and chips layer 303 may include the system on chip (SOC) 315, which is a microchip with the electronic circuits and parts for the computing device 300. The SOC 315 may comprise a central processing unit (CPU) 318, a GPU 321, and a double data rate (DDR) 323. The CPU 318 may be similar to the processor 230, which comprises multiple cores 233 and 234. The GPU 321 is a computational processing unit for graphics processing and rendering. The DDR 323 is an advanced version of a synchronous dynamic random access memory (DRAM). The DDR 323 may be used in conjunction with the CPU 318 and the GPU 321 to carry data between the CPU 318 and the GPU 321. The embodiments of command stream optimization and enhancement disclosed herein may be implemented by the CPU 318, a GPU 321, and DDR 323 of the SOC 315, as will be further discussed below with reference to FIG. 4.

The network components 325, the display 327, the disk 328, the touch screen 329, and the audio speaker/microphone 345 may be hardware components that are related to the execution of the video game and the user experience of the video game. However, the network components 325, the display 327, the disk 328, the touch screen 329, and the audio speaker/microphone 345 are not affected by the embodiments of command stream optimization and enhancement disclosed herein.

The OS and platform layer 306 includes one or more graphics APIs 330, graphics drivers 331, a compositor 332, a dynamic voltage and frequency scaler (DVFS) 333, a scheduler 344, a thermal controller 335, and one or more device drivers 336. The one or more graphics APIs 330 may correspond to the commands 270 and may be APIs that are called by the game engine layer 309 to render components of a frame 105. The graphic drivers 331 are software written for the OS executing at the computing device 300 that is used to communicate with the components at the hardware and chips layer 303. The compositor 332 is software that retrieves frames 105 from the DDR 323 and then displays the frame 105 on the display 327 of the computing device 300. The DVFS 333 is software that is used to adjust power and speed settings of the CPU 318, a GPU 321, and DDR 323 of the computing device 300. The scheduler 334 is software that manages the order of execution of various functions and events occurring at the computing device 300. The thermal controller 335 may be software that detects a temperature of the computing device 300 and then adjusts the hardware and chips layer 303 components to adjust the temperature of the computing device 300. The device drivers 336 are software or programs that control devices that are attached to the computing device 300.

The game engine layer 309 may include software components that are part of the rendering engine and used by the rendering engine to process and render a frame 105. For example, the game engine layer 309 may be configured to translate the components of the frame 105 identified by the game and rendering logic updates 110 into commands 270 that are called by the video game. The game engine layer 309 may include physics engine 377, scenes/objects 338, a renderer 339, and events/scripts 340. The physics engine 377 is software that provides an approximate simulation of certain physical systems, such as rigid body dynamics (including collision detection), soft body dynamics, and fluid dynamics, of use in the domains of computer graphics, video games, and film. The scenes/objects 338 may include the logic units that the game uses to describe and manage the objects being rendered on the scene, in which the scene may include multiple objects (e.g., characters, buildings, fires, trees, etc.). The game may also include multiple scenes (e.g., training fields, site A, site B, etc.). The renderer 339 may be the software of the rendering engine that actually renders the frame 105. The events/scripts 340 may include a system that the game can dynamically use to communicate with the game engine layer 309. Events refers to events occurring during the game, such as, for example, an animation being started, playing, ending, objects moving in and out of view, etc. A script refers to logic defined by the game that reacts to the events, such as, for example, removing an objection from the scene, updating lighting conditions or parameters, etc.

The game layer 311 may include data related to a particular video game, such as accounts 341, simulation/artificial intelligence (AI) 342, level design 343, and assets/resources 344. The accounts 341 may refer to the accounts for various users of the video game associated with the game layer 311. The simulation/AI 342 include the simulation and AI for various frames 105 of the video game. The level design 343 may include data regarding various levels of the video game. The assets/resources 344 may include data regarding specific assets or resources of objects included in the frames 105 that may be specific to the video game. For example, the assets/resources 344 may be three dimensional (3D) meshes that define a shape of an object, a texture of an object, a material of an object, or a general look of the object.

During implementation, the components of each of these layers 303, 306, 309, and 311 may be initiated to process and render one or more frames 105 during execution of a video game based on user input. In one embodiment, command stream optimization and enhancement may be performed by the OS and platform layer 306, as further described below with reference to FIG. 4. In some cases, the game engine layer 309 and the graphics drivers 664 are not changed to implemented the command stream optimization and enhancement mechanisms disclosed herein.

In one embodiment, the embodiments of command stream optimization and enhancement may be performed by any of layers 303, 306, 309, and 311 so long as the layer 303, 306, 309, or 311 is configured to capture commands 270 from rendering logic 113, store the commands 270 in a command buffer 285 to create a command stream 115, reconstruct the commands 270 in the command stream 115, and then execute the command stream 115 on the command stream thread 125. For example, the embodiments of command stream optimization and enhancement may be performed by a user mode driver (one or more device drivers 336), a game engine executed at the game engine layer 309, or an application itself executed at the game layer 311. In an embodiment, each of the plurality of commands 270 in the command stream 115 comprises a call to an interface implemented at a game layer 311 of the computing device 300. In an embodiment, each of the plurality of commands 270 in the command stream 115 comprises a call to an interface implemented at a game engine layer 309 of the computing device 300.

In some cases, when the embodiments of command stream optimization and enhancement are performed at the driver level (one or more device drivers 336), the steps of capturing the commands 270 from the rendering logic 113 and storing the commands 270 in the command buffer 285 may be drastically simplified since the drivers (one or more device drivers 336) already store the information needed for the capturing and storing steps of capturing the commands 270 from the rendering logic 113 and storing the commands 270 in the command buffer 285. For example, the one or more device drivers may only be configured to perform the In an embodiment, the steps of capturing the commands 270 from rendering logic 113, storing the commands 270 in a command buffer 285 to create a command stream 115, reconstructing the commands 270 in the command stream 115, and then executing the command stream 115 on the command stream thread 125 do not all have to be implemented at the same layer 303, 306, 309, or 311.

Figure 4:
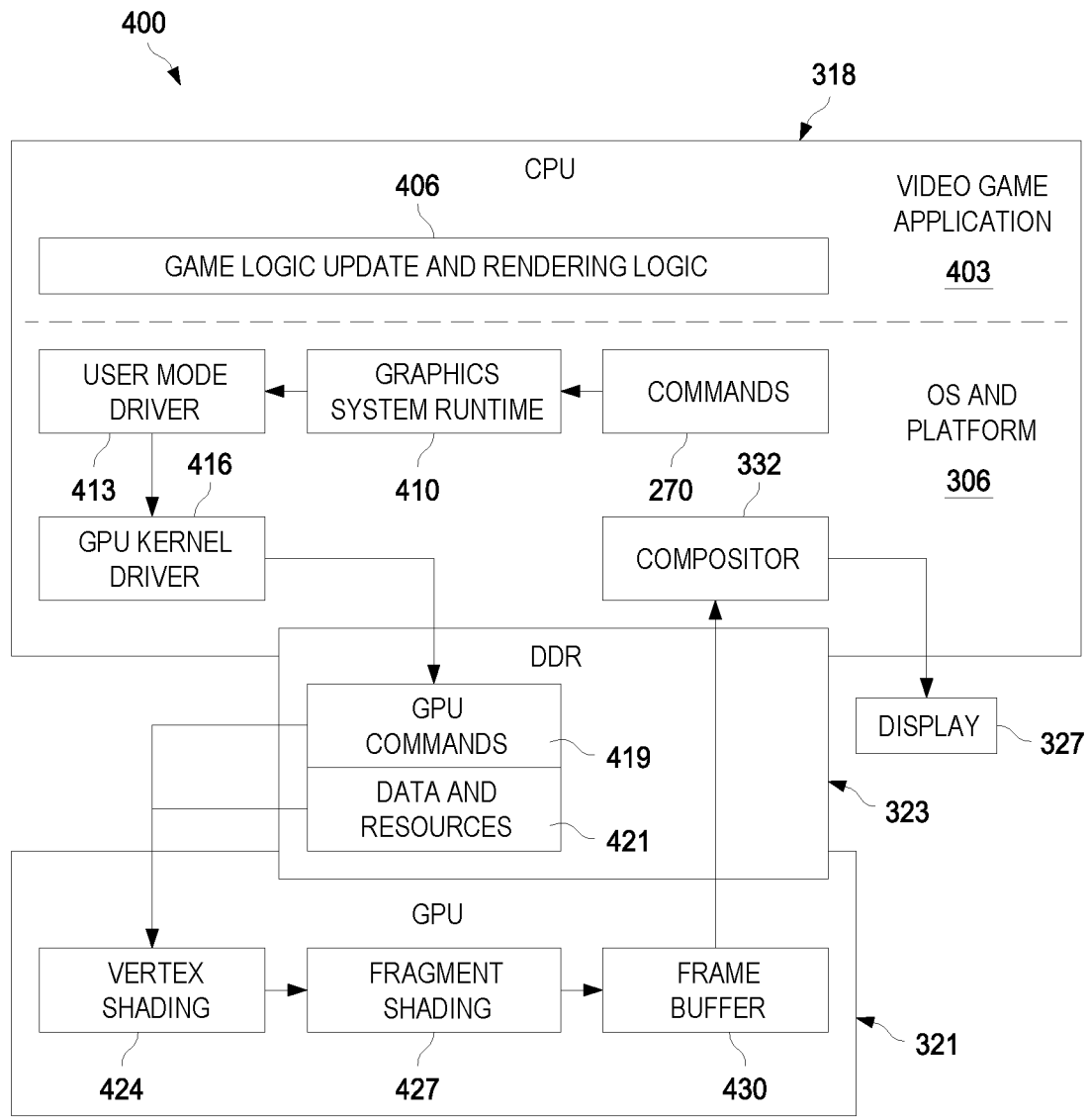
FIG. 4 is a diagram illustrating a data flow between the video game application, the operating system (OS) and platform layer, the double data rate (DDR), and the GPU in processing and rendering frames the video game application.

FIG. 4 is a diagram 400 illustrating a data flow between the video game application 403, the OS and platform layer 306, the DDR 323, and the GPU 321 in processing and rendering frames 105 for the video game application 403. The data flow may begin with the execution 406 of the game logic update 110 and the rendering logic 113 for a particular frame 105. As described above, the game logic update 110 determines the components of the frame 105, such as the objects and aspects that are to be displayed in the frame 105, and then the rendering logic 113 performs the basic rendering functions to render the frame 105. While performing the rendering logic 113, the commands 270, such as calls to graphics APIs 330, that should be invoked to render the components of the frame 150 may be determined. The execution 406 of the game logic update 110 and the rendering logic 113 may be performed by the original thread 120 of the first core 233 of the computing device 200 or 300. The original thread 120 of the first core 233 may also determine the commands 270 to call to render the frame 105.

At this point, the graphics system runtime 410 may begin execution 406 of the command stream optimization and enhancement based on the commands 270 determined by the rendering engine. In an embodiment, the graphics system runtime 410 may capture (e.g., determine) the commands 270 from the frame logic 107 to create the command stream 115. Each of the commands 270 may be stored temporarily, for example, in a cache of the memory 240. The commands 270 may subsequently be transmitted to the second core 234 such that the command stream thread 125 may execute the commands 270 of the command stream 115. In an embodiment, the command stream thread 125 may execute the command stream 115 substantially in parallel with the original thread 120 executing the game and rendering logic 127, which decreases the amount of time required to process and render a frame 105, and thus increases the frame rate of the video game.

As will be further discussed below with reference to FIG. 9, the commands 270 within the command stream 115 may be modified based on redundancies and parameters of the commands 270. These modifications of the commands 270 within the command stream 115 may further increase the frame rate of the video game and reduce the power consumption of the video game.

After separating the game and rendering logic 127 from the command stream 115 such that the game and rendering logic 127 and the command stream 115 are executed by different threads 120 and 125 (multi-thread rendering 106A), the data flow may continue with the calling of the user mode driver 413. Similarly, after separating the game logic update 110, the rendering logic 113, and the command stream 115 from the frame logic 107 such that the game logic update 110, the rendering logic 113, and the command stream 115 are executed by different threads (multi-thread rendering 106B), the data flow may continue with the calling of the user mode driver 413. The user mode driver 413 may store a mapping of an actual implementation (e.g., code) of a graphics API 330 for each of the commands 270 that were captured and cached. For example, the user mode driver 413 identifies the software code corresponding to the commands 270 that were cached. In an embodiment, the user mode driver 413 may be executed by the command stream thread 125 of the second core 234. The commands may be called into the user mode driver 413, which performs data transfers and GPU command translations that may be used to call the command. The GPU kernel mode driver 416 may be configured to copy the data from a memory 240 of the CPU 318 to the GPU 321. The DDR 323 may store GPU commands 419 corresponding to the commands 270 and any data and resources 421, such as the assets/resources 344, which are associated with the video game application 403. The GPU 321 may access the GPU commands 419 and the data and resources 421 from the DDR 323.

The GPU 321 may execute the GPU commands 419 using the data and resources 421 and perform other graphical processing steps, such as vertex shading 424 and fragment shading 427, to render a frame 105. Vertex shading 424 relates to identifying and fixing the positioning information of the various objects displayed by the frame 105. Fragment shading 427 relates to determining and fixing the color of each pixel of the frame 105. While only vertex shading 424 and fragment shading 427 are described with relation to FIG. 4, it should be appreciated that other types of computations, determinations, or graphical enhancements may be performed by the GPU 321 during the rendering process. The objects may then be rendered onto a frame buffer 430, which is stored in a GPU memory and then copied into the DDR 323 by the kernel driver 416. The compositor 332 may grab the content from the frame buffer 430 of the DDR 323 and then render the frame 105 on the display 327.

Based on the data flow shown above, the majority of the workload on the CPU 318 comes from the game logic update 110, the rendering logic 113, and the execution of the commands 270. The workload on the GPU 321 almost completely comes from graphics rendering. The DDR 323 is the data bridge between the CPU 318 and the GPU 321, and the DDR 323 directly contributes to the performance and efficiency of the CPU 318 and the GPU 321. Accordingly, the power consumption on the SOC 315 mainly comes from the CPU 318, GPU 321, and the DDR 323.

For example, suppose that Game X operates with a resolution of 1080 pixels at 60 FPS. In this case, the power consumption distribution ratio for the CPU 318:GPU 321:DDR 323 is 58%:25%:16%, respectively. At the same time, the SOC 315 power consumption accounts for 50% of the power consumption of the overall computing device 300. The embodiments disclosed herein that is implemented by the graphics system runtime 410 improves the frame rate (also referred to herein as performance) and power consumption on the SOC 315 by reducing the workload and changing workload distribution while providing a platform to add additional visual effects and enhancements to a frame 105.

Figure 5:
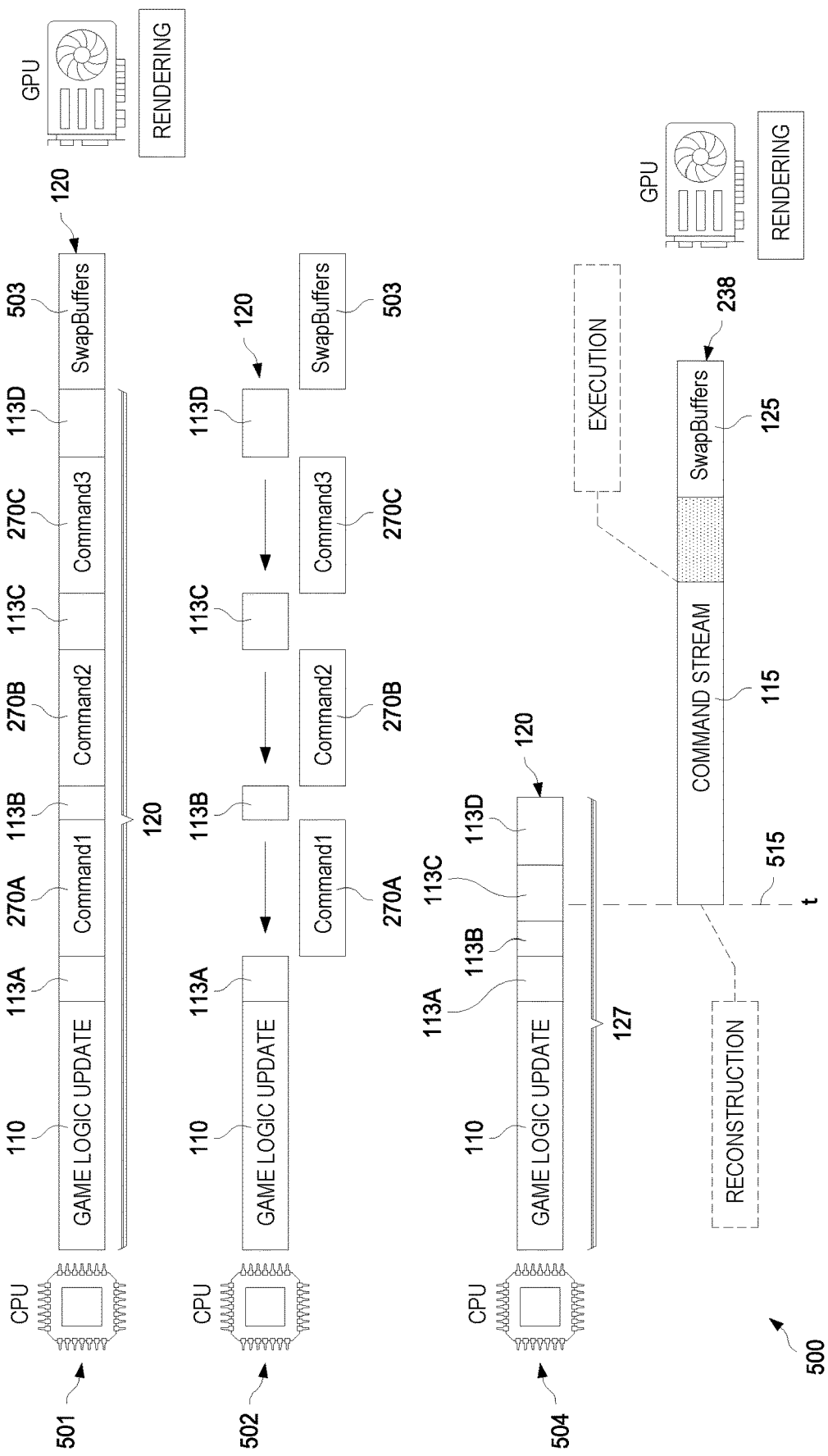
FIG. 5 is a diagram illustrating a method of capturing the commands from the frame rendering logic to create a command stream according to various embodiments of the disclosure.

FIG. 5 is a diagram illustrating a method 500 of capturing the commands 270 from the frame rendering logic 170 to create a command stream 115 according to various embodiments of the disclosure. Arrow 501 shows the frame logic 107 executed by the single original thread 120 and the swap buffer 503. The frame logic 107 shown by arrow 501 includes the game logic update 110, rendering logic 113A-D, and commands 270A-C. The swap buffer 503 may be configured to finish rendering the frame 105 upon completion of the execution of the render logic 113A-D and the commands 270A-C and then transmit the rendered frame to the GPU 321.

As shown by FIG. 5, the rendering logic 113A-D is positioned sporadically in between the commands 270A-C. This may be because the rendering engine does not determine the commands 270 used to render a frame 105 all at one time. Instead, the rendering engine typically performs one or more computations (e.g., performs the rendering logic 113A-D) and then determines a first command 270A, then again performs one or more computations, and then determines a second command 270B, and so on. The commands 270A-C that should be called to render a frame 105 is determined sequentially.

Arrow 502 shows that after the commands 270A-C are determined from the frame logic 107, the commands 270A-C that would have been executed by the original thread 120 may be removed from the frame logic 107. For example, the graphics APIs that correspond to the commands 270A-C may be extracted from the rendering logic 113. In an embodiment, the commands 270A-C may stored, or cached, in a command buffer 285 such that the commands 270A-C may be executed by the command stream thread 125.

Arrow 504 shows that the rendering logic 113A-D may be concatenated and appended to the end of the game logic update 110. The game logic update 110 and the concatenated rendering logic 113A-D may be executed by the original thread 120.

In an embodiment, the commands 270A-C may be retrieved from the command buffer 285 and collected to create the command stream 115. For example, the command stream 115 may be created by combining the extracted graphics APIs that correspond to the commands 270A-C. The order with which the commands 270A-C were determined based on the frame logic 107 is maintained in the command stream 115. In an embodiment, the commands 270 are ordered in the command stream 115 in the same order in which the commands were captured from the frame logic 107 to preserve the sequence of commands 270 determined by the rendering engine. In an embodiment, commands 270 within the command stream 115 may be modified to essentially reconstruct the command stream 115, which will be further described below with reference to FIG. 9. While this may change the order of commands 270 determined by the rendering engine, the order of the other commands 270 may otherwise remain unchanged such that the basic effect of the execution of all the commands 270 in the command stream 115 remains the same.

As shown by FIG. 5, the command stream 115 may begin execution at a time 515 sometime after the game logic update 110 has executed and sometime before completion of the rendering logic 113D. In this way, the command stream 115 may begin execution on the command stream thread 125 in parallel with (or simultaneously with) the execution of some of the rendering logic 113A-D. In addition, the execution of the command stream 115 is asynchronous of the execution of the game logic update 110 and the rendering logic 113A-D. For example, the execution of the command stream 115 is decoupled from and run separately from the execution of the game logic update 110 and the rendering logic 113A-D. In some cases, the sequential order of the game logic update 110 and the rendering logic 113A-D with respect to commands 270 of the command stream 115 may still be maintained. Further detail regarding a timing of executing the command stream 115 relative to a timing of executing the game and rendering logic 127 is described below with reference to FIGS. 10-14.

In an embodiment, the method 500 of capturing the commands 270 from the frame rendering logic 170 to create a command stream 115 may be initiated during the execution of a graphics application. In an embodiment, a user may be provided with an option before or during execution of a graphics application, such as a video game, to enable multi-threading 106A or 106B, and thereby initiate method 500 of extracting commands 270 from the rendering logic 113 and combining the commands 270 to create the command stream 115.

In an embodiment, a configuration file for a particular graphics application may be installed on the computing device 200, and the configuration file may indicate whether the graphics application is executed using multi-threading 106A or 106. In this way, the configuration file for a particular graphics application indicates whether to initiate method 500 of extracting commands 270 from the rendering logic 113 and combining the commands 270 to create the command stream 115 to render the graphics application.

In an embodiment, the computing device 200 may be configured with detection logic such that during runtime of a graphics application, the computing device 200 is configured to automatically switch between the single-thread rendering 103 and multi-thread rendering 106A or 106B. For example, the computing device 200 may be configured to use single-thread rendering 103 for certain types of graphics applications, and the computing device 200 may be configured to use multi-thread rendering 106A and 106B for other, more complex, types of graphics applications. In an embodiment, the computing device 200 is configured to switch back and forth between single-thread rendering 103 and multi-thread rendering 106A or 106B for a single graphics application. An example of how the computing device 200 is configured to perform this switching back and forth is described below with reference to FIG. 6.

Figure 6:
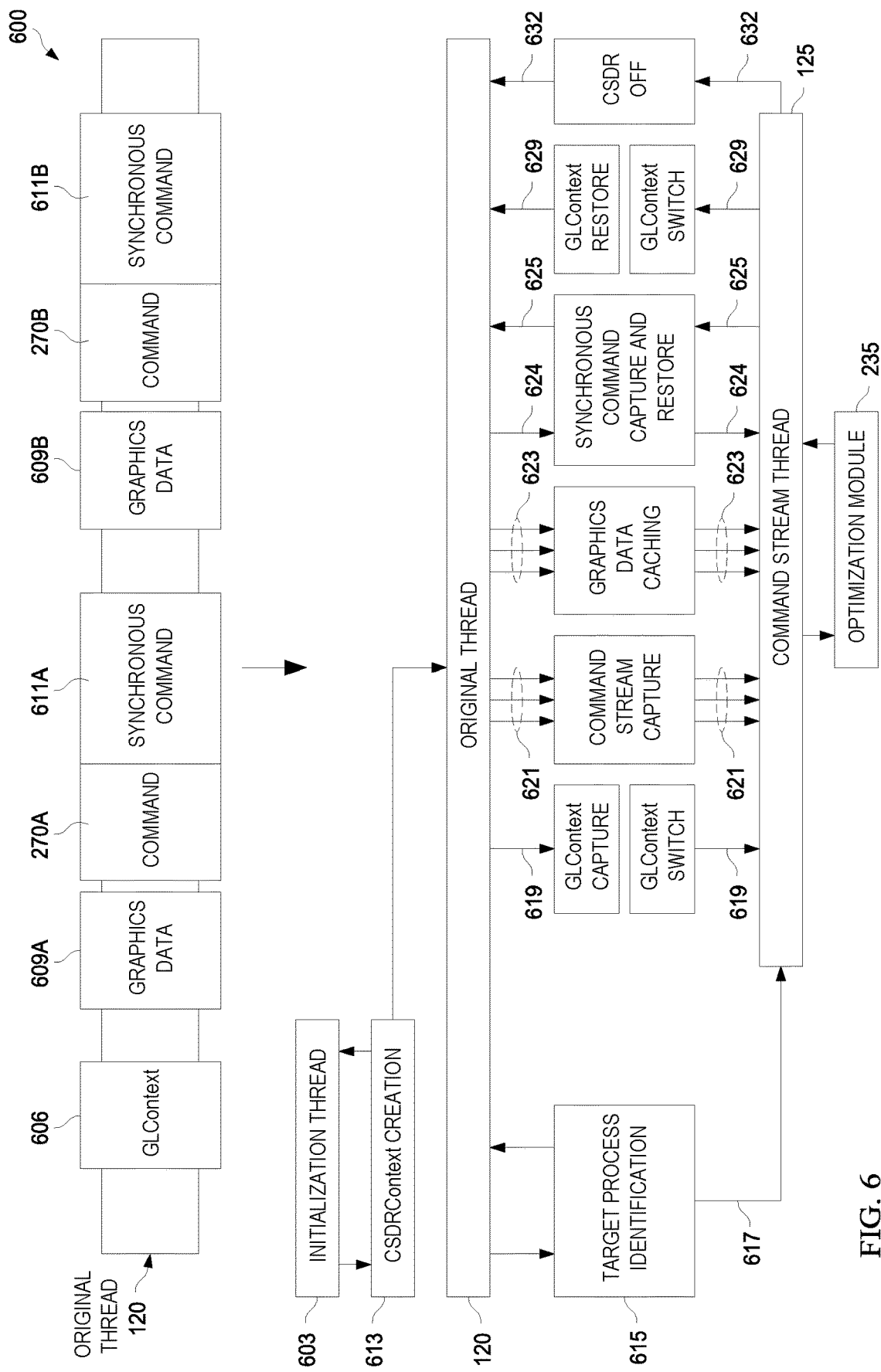
FIG. 6 is a diagram illustrating a method of command stream optimization and enhancement implemented by a computing device using the OPEN GRAPHICS LIBRARY (OPEN GL) API according to various embodiments of the disclosure.

FIG. 6 is a diagram illustrating a method 600 of command stream optimization and enhancement implemented by a computing device 200 or 300 using the OPEN GRAPHICS LIBRARY (OPEN GL) API according to various embodiments of the disclosure. An original thread 120 may include the computation, determination, or execution of an GLCONTEXT 606, a first graphics data 609A, a first command 270A, a first synchronous command 611A, a second graphics data 609B, a second command 270B, and a second synchronous command 611B. The GLCONTEXT 606 is an environment for OPEN GL that stores and maintains states, or data, based on the execution of various commands 270 for rendering a frame 105. OPEN GL refers to the graphics API on desktop platforms, in which OPEN GL embedded systems (ES) is the embedded version of OPEN GL. OPEN GL ES is mostly used in mobile computing devices 200. The first and second graphics data 609A-B may be any data that is associated with the rendering of the frame 105, similar to the assets/resources 344 and the data and resources 421. The first and second commands 270A-B may be calls to two different OPENGL APIs. The first and second synchronous commands 611A-B may refer commands 270 that cannot run asynchronously because the synchronous commands 611A-B output data that needs to be subsequently used by other commands 270 or rendering logic 113, as will be further described below.

In an embodiment, the initialization thread 603 may initialize a command stream dynamic reconstruction (CDSR) context 613, which may be similar to the GLCONTEXT 606 in that the CDSR context 613 also stores states, or data, based on the implementation of various commands 270. In an embodiment, the CDSR context 613 may be implemented by extending an existing GL HOOKS mechanism, which typically runs on the ANDROID platform. The CSDR context 613 inherits from the GLCONTEXT 606 with some modifications based on that such as the GL HOOKS table.

Upon creation of the CSDR context 613, the process of optimizing and enhancing command streams 115 for processing and rendering a frame 105 may begin. In an embodiment, the optimization module 235 may be loaded and installed to the CSDR context 613 and then executed by the command stream thread 125. The optimization module 235 may be configured to create the command stream 115, reconstruct the command stream 125, add visual enhancements to the command stream 115, and execute the command stream 115 by the command stream thread 125.

In an embodiment, a target process may be identified that determines when the command stream thread 125 should be created, as shown by arrow 617. Once the command stream 115 has been created, the command stream thread 125 may begin executing the commands 270 stored at the command buffer 285. As shown by arrow 619, the GLCONTEXT 606 may be transmitted to the command stream thread 125 such that the command stream thread 125 may update the states in the GLCONTEXT 606 as commands 270 are executed.

As shown by arrow 621, the commands 270A-B may be captured and removed from the original thread 120 and cached sequentially at a command buffer 285 to create a command stream 115. The command stream thread 125 may fetch the commands 270 from the command buffer 285 for execution by the command stream thread 125 instead of the original thread 120. As shown by arrows 623, the graphics data 609A-B are also captured and removed from the original thread 120 and cached such that the command stream thread 125 may fetch the graphics data 609A-B as needed to execute the commands 270A-B.

There may be various types or categories of commands 270. For example, one type of command 270 simply sets a state in the GLCONTEXT 606. Another type of command 270 is used for the transfer of graphics data 609A-B, such as the transfer of texture vertices from the DDR 323 to the GPU 321. Another type of command 270 is a draw call that commands the consumer of the data or the states, which is the GPU 321, to use the commands 270, data, and/or states to draw the final objects onto the frame 105.

Some of these commands 270 may be commands 270 that are synchronous (also referred to herein as synchronous commands 611A-B). Synchronous commands 611A-B may not be simply moved to another thread (e.g., command stream thread 125) without consideration of the subsequent commands 270 or rendering logic 113 that uses the output or state change of the synchronous command 611A-B. As shown by arrow 624, these synchronous commands 611A-B may be captured and cached similar to the way commands 270 are captured and cached. However, the execution of the original thread 120 may have to wait for the synchronous command 611A-B to be fetched and executed before the original thread 120 may continue executing, as will be further described below with reference to FIGS. 11, 14, and 15. In this case, as shown by arrow 625, a state or data may be restored at the original thread 120 based on the execution of the synchronous command 611A-B before the original thread 120 may continue execution.

When it is determined that the CSDR mechanism should be turned off, the final and updated GLCONTEXT 606 may be transmitted back to the original thread 120, as shown by arrow 629. The command stream thread 125 may be put to sleep or terminated at this point until another target process is identified for rendering a frame 105 using the command stream thread 125, as shown by arrow 632. All processing and rendering may resume on the original thread 120.

Figure 7:
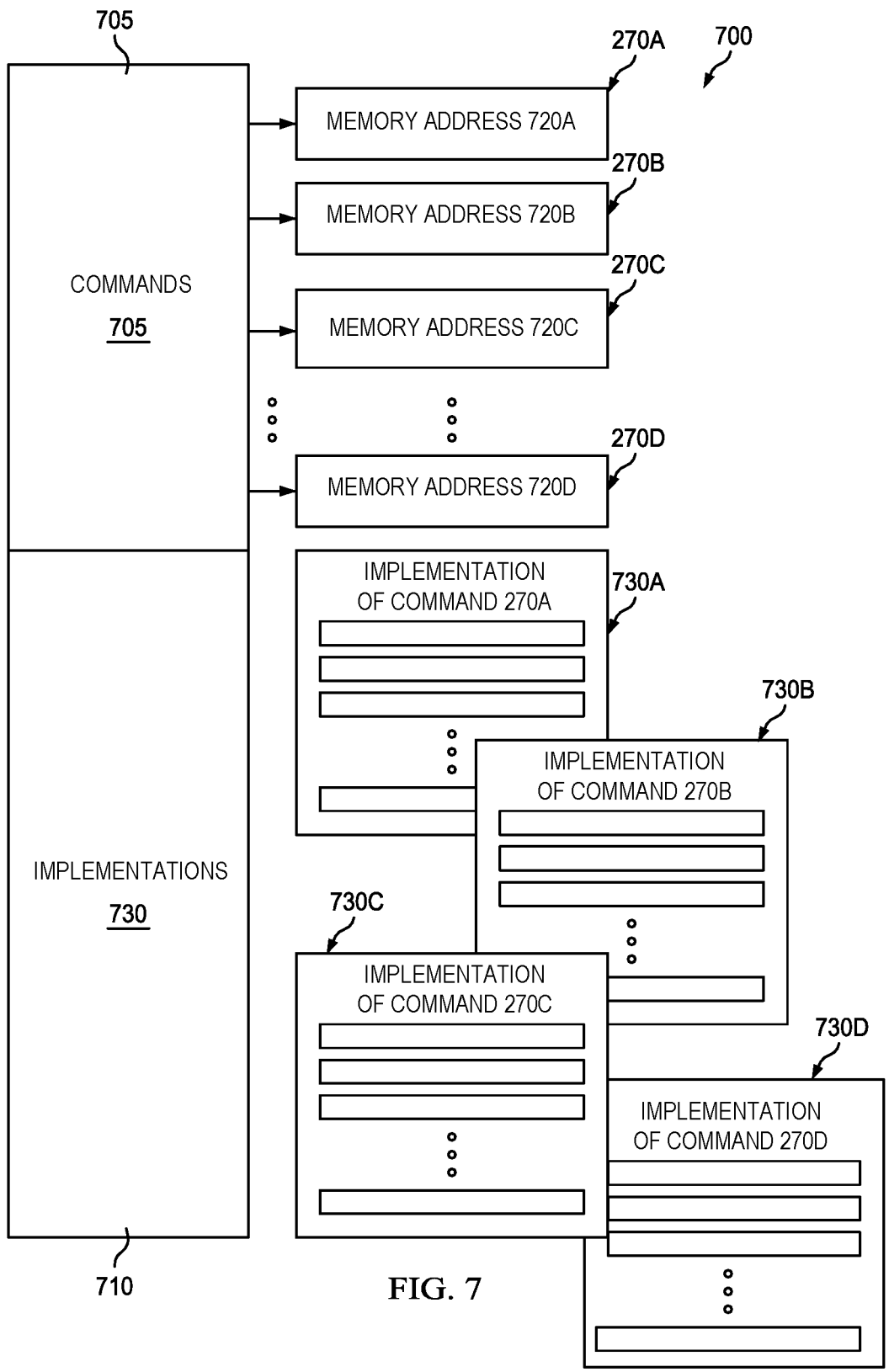
FIG. 7 is a table illustrating how the commands are called at the computing device according to various embodiments.

FIG. 7 is a table 700 illustrating how the commands 270 are called at the computing device 200 or 300 according to various embodiments. In an embodiment, the command stream thread 125 may call the commands 270 using the table 700.

Table 700 includes the commands table 705 and the implementation table 710. The commands table 705 may store the default implementations of one or more commands 270, which are calls to graphics APIs 330. The commands may also store may store smaller amounts of data such as the memory addresses 720 of the commands 270. In some embodiments, commands table 705 may store other small amounts of data associated with a command 270. An identifier of the command may be inferred by an offset in table 700.

In an embodiment, the commands table 705 may include the default OPEN GL implementations for various graphics APIs 330. CSDR implementations 730 of the commands 270 to enable multi-thread rendering 106A-B, in which the actual implementations 730 refer to the software code used to implement the API corresponding to the command 270. The implementations 730 are stored according to the memory address 720 of the command 270. The commands table may be extended to include the implementations table 710, which includes the CSDR implementations 730 of the commands 270 to enable multi-thread rendering 106A-B. The CSDR implementations 730 refer to the software code used to implement the API corresponding to the command 270. The implementations 730 are stored according to the memory address 720 of the command 270. The CSDR implementations 730 may be modified to maintain compatibility with the original design and also adaptable to CSDR implementations with best performance. In some embodiments, the command stream thread 125 may be configured to select one of the implementations 730 stored for a particular command 270.

As shown in FIG. 7, the commands table 705 includes entries for four different commands 270, in which one of these commands 270 is a synchronous command 611A. The entry for command 270A includes a memory address 720A of the implementation 730A of the command 270A. The entry for command 270B includes a memory address 720B of the implementation 730B of the command 270B. The entry for command 270C includes a memory address 720C of the implementation 730 of the command 270C. The entry for command 270D includes a memory address 720D of the implementation 730D of the command 270D. The memory address 720A-D may refer to an entry point of a memory location where the implementation 730 (e.g., code or software components associated with a particular command 270) is stored. The commands table 705 may include pointers to data associated with any number of commands 270 (including synchronous commands 611), even though data for only four commands 270 are shown in FIG. 5.

The corresponding implementations table 710 includes entries for many different commands 270, including commands 270A-B, D, and synchronous command 611A. As shown by FIG. 7, the implementations table 710 stores implementations 730 for each of the commands 270, in which implementations 730 may include all the software components (e.g., code, algorithms, variables, objects, libraries, classes, other APIs, etc.) that are associated with the execution of the command 270.

In an embodiment, the graphics APIs 330 corresponding to the commands 270A-D may be reinterpreted by the computing device 200. For example, the command stream thread 125 may be configured to select one of the implementations 730 stored for a particular command 270. In an embodiment, command stream information comprising graphics data and data dependencies between commands 270A-D in a command stream 115 may be determined. In an embodiment, the command stream information may be organized and stored into a command buffer 285 that is stored in a memory 240 of the computing device 200 with fast memory write operations.

In an embodiment, using table 700 is more efficient and consumes fewer resources because of the nature of storing the commands table 705 in a temporary cache while storing the implementations table 710 in a static memory. The commands 270 in table 700 may be easily modified by changing the pointers in implementations 730. Therefore, the overhead of using the table 700 is low relative to other schemes of capture commands 270.

As an example, GL HOOKS is a table similar to table 700, except that GL HOOKS stores pointers to various graphics APIs implementations. In this way, table 700 may be used as an extension to the GL HOOKS table that is used by many ANDROID devices for graphics rendering. This enables the flexibility of switching between different optimization implementations and game specific override at runtime at GLCONTEXT (or thread) granularity while avoiding the need for runtime checks and branches and minimizing runtime overhead (nearly zero).

Figure 8:
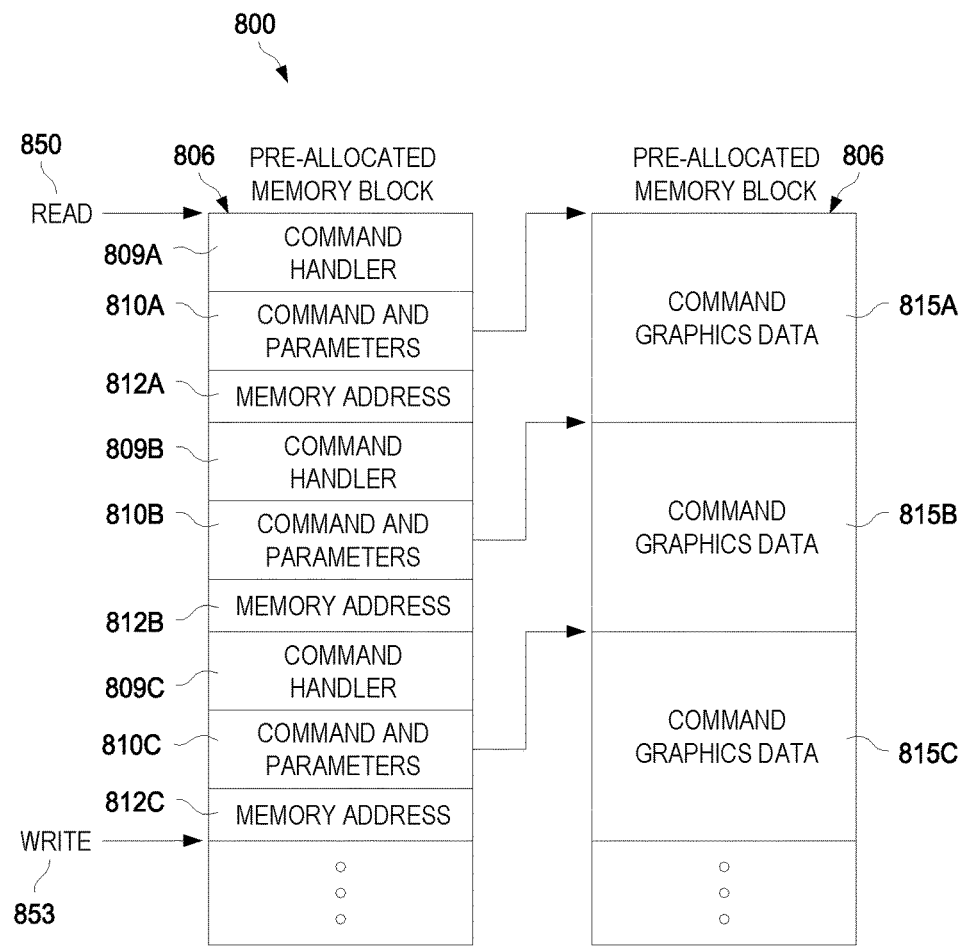
FIG. 8 is a diagram illustrating a memory layout used to store data associated with the commands according to various embodiments.

FIG. 8 is a diagram illustrating a memory layout 800 of a command buffer 285 used to store data associated with the commands 270 (including synchronous commands 611) according to various embodiments. Memory layout 800 shows two pre-allocated memory blocks 803 and 806 that may be logically and physically separated but located at the same computing device 200 or 300. The memory block 803 stores content that is smaller in size, such as command handles 809A-C for the various commands 270A-C, one or more parameters 810A-C used for executing the commands 270A-C, and a memory address 812A-C address. Memory block 806 stores content that is larger in size, such as the actual commands graphics data 815A-C for commands 270 that are to be executed to render a frame 105. As should be appreciated, the memory block 803 may store other content that is small in size and associated with the commands 270 that have been determined for rendering a frame 105. Similarly, the memory block 806 may store other content that is larger in size and associated with the commands 270 that have been determined for rendering a frame 105.

The command handles 809A-C may be identifiers or names associated with the command 270 and may be a 32 bit value or a 64 bit value depending on whether the system is a 32 bit system or a 64 bit system, respectively. The parameters 810A-C may include one to six parameters that are used to execute a command 270 and may be in between 4 bytes and 8 bytes in length, typically. The memory address 812A-C may be pointers to the beginning of where corresponding command graphics data 815A-C is stored in memory block 806.

As shown in FIG. 8, the memory block 803 includes a command handler 809A for a command 270A, one or more parameters 810A for command 270A, and a memory address 812A for the corresponding command graphics data 815A (stored at memory block 806). The memory block 803 also includes a command handler 809B for a command 270B, one or more parameters 810B for command 270B, and a memory address 812B for the corresponding command graphics data 815B (stored at memory block 806). The memory block 803 further includes a command handler 809C for a command 270C, one or more parameters 810C for command 270C, and a memory address 812C for the corresponding command graphics data 815C (stored at memory block 806).

As commands 270 are being captured from the frame rendering logic, the commands 270 may be added to the memory blocks 803 and 806 of the command buffer 285 using a write operation 853. When the command stream thread 125 fetches or retrieves the commands 270 from the memory blocks 803 and 806, the commands 270 may be fetched or retrieved using a write operation 850.

The customized data structure of these memory blocks 803 and 806 help minimize memory fragmentation and runtime overhead of dynamic memory allocation and management. The use of the memory blocks 803 and 806 also help maximize memory access locality and cache optimization for both the original thread 120 and the command stream thread 125. In some cases, the use of the memory blocks 803 and 806 help ensure that writes and reads are performed sequentially to maximize cache optimization. The memory blocks 803 and 806 may be reused across frames 105, avoiding runtime memory management. A multi-frame buffer design may be used to avoid contention on command stream buffers 285. Separating buffers for commands 270, parameters 810, and graphics data 815 also ensures the compactness of buffers for the command 270 and parameters 810.

Figure 9:
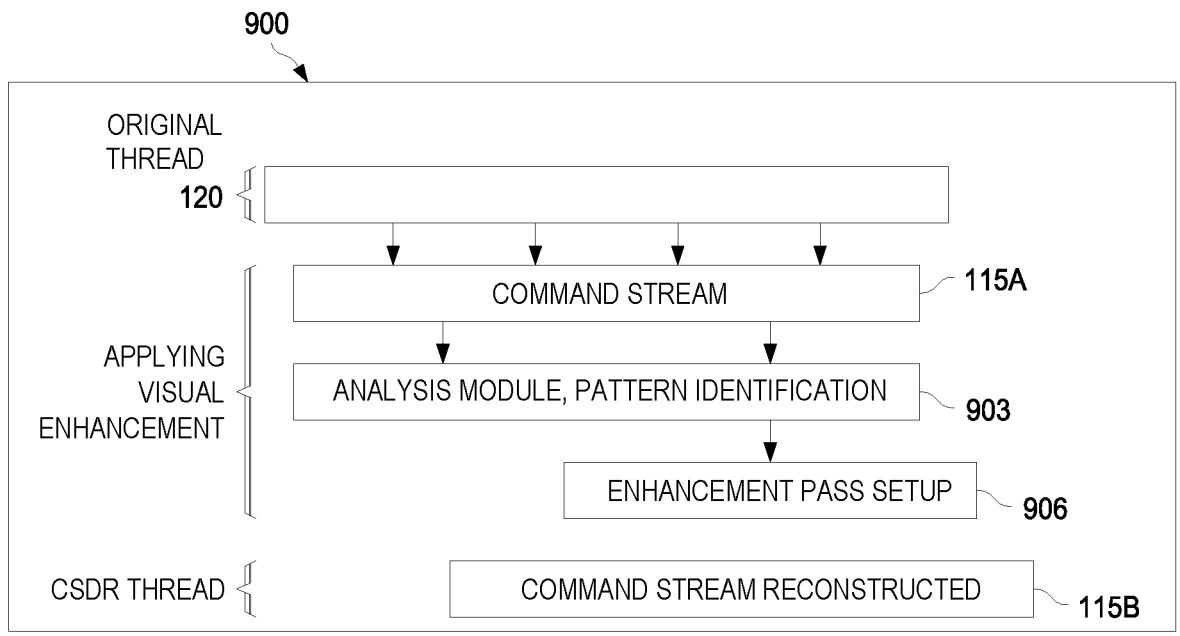
FIG. 9 illustrates a method of generating an enhanced and reconstructed command stream according to various embodiments of the disclosure.

FIG. 9 illustrates a method 900 of generating an enhanced and reconstructed command stream 115 according to various embodiments of the disclosure. The method 900 begins with capturing the commands 270 and generating the command stream 115A, which includes the commands 270 in the order that the commands 270 were captured from the frame rendering thread 107.

At step 903, the commands 270 in the command stream 115A may be analyzed to determine if the commands 270 may be modified for the purpose of increasing the frame rate and/or decreasing the power consumed while rendering the frame 105 using the commands 270. In some cases, redundancies between commands 270 may be identified. The redundant commands 270 may be removed from the command stream 270.

In some cases, some parameters 810 for commands 270 are set unnecessarily high to the extent that the parameters 810 unnecessarily decrease the frame rate and increase the power consumption for that video game. For example, a DDR frequency refers to how much data transfer happens on the DDR 323. Typically, the higher the DDR frequency, the more power that is consumed by the computing device 200 or 300. Data is typically transferred between the DDR 323 and the GPU 321, and therefore, there may be a high bandwidth of data transfer occurring between the DDR 323 and the GPU 321. In some cases, commands 270 for rendering a frame 105 may have a parameter 810 specifying a very high resolution for a frame buffer that may not be necessary and will increase the DDR frequency (thereby increasing power consumption). A determination may be made as to whether the resolution of the frame 105 may be decreased while maintaining the same or substantially the same quality of the frame 105 that is being rendered. If so, the parameter 810 relating to the resolution of the frame 105 may be decreased for a particular command 270.

In an embodiment, the computing device 200 or 300 may be configured to determine similar patterns in which parameters 810 for commands 270 may be adjusted (e.g., reduced) while still rendering the same or substantially the same quality frame 105. The changing of these parameters 810 may enable the rendering of the frame 105 to consume less bandwidth between the DDR 323 and the GPU 321 and use less memory on the computing device 200 or 300.

In some cases, commands 270 may even be inserted into the command stream 115A. The modification of the command stream 115A by inserting commands 270, deleting redundant commands 270, and changing the parameters 810 for one or more of the commands 270 creates the reconstructed command stream 115B.

At step 906, additional enhancements or visual effects may be applied to the frame 105 being rendered using the command stream 115B. For example, additional commands 270 or APIs related to visual effects (e.g., shade, color, brightness, texture of pixels of the image, etc.) may be added or inserted to the command stream 115 after the last command 270. These additional visual effects may be rendered by the command stream thread 125 on the frame 105. Upon addition of these visual effects to the command stream, an enhanced and reconstructed command stream 115B may be created.

Figure 10:
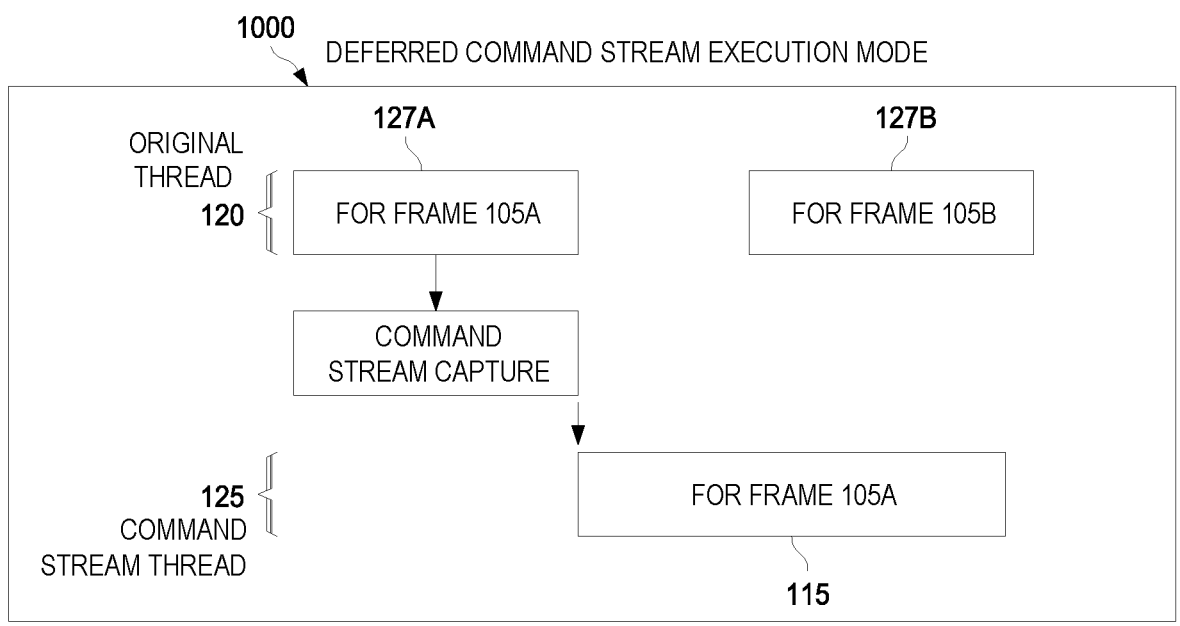
FIG. 10 is a diagram illustrating a deferred command stream execution mode according to various embodiments of the disclosure.

FIG. 10 is a diagram illustrating a deferred command stream execution mode 1000 according to various embodiments of the disclosure. In the deferred command stream execution mode 1000, the original thread 120 may determine the commands 270 that should be used to render a frame 105. The commands 270 may reconstructed and enhanced according to method 1000 to generate a command stream 115 (which may be similar to the command stream 115B described with reference to method 900). As previously described with respect to FIG. 5, the commands 270 may be determined at various times during the initial processing phase of the frame 105, which may include the game logic update 110 and one or more of the rendering logic 113.

As shown by FIG. 10, the game and rendering logic 127 (including the game logic update 110 and all of the rendering logic 113 used to render a frame 105A) may be fully executed by the original thread 120 before the commands 270 that should be used to render frame 105A are captured and cached at the command buffer 285 to create the command stream 115. After the command stream 115 is generated for frame 105A and stored in a manner similar to that shown in FIG. 8 using memory blocks 803 and 806, the command stream thread 125 may retrieve the commands 270 from the command buffer 285 (e.g., memory blocks 803 and 806) to execute the commands 270. In an embodiment, the commands 270 may be called using the table 700.

In an embodiment, the deferred command stream execution mode 1000 enables two different frames 105 to be processed and rendered at the same time. As shown by FIG. 10, while the command stream thread 125 is executing the commands 270 of the command stream 115, the original thread 120 may begin the game and rendering logic 127 for a first frame 105 (including the game logic update 110 and all of the rendering logic 113 used to render a frame 105B) for another frame 105B. In some cases, the deferred command stream execution mode 1000 may cause a delay in the processing and rendering of a frame 105 when the original thread 120 is capturing the commands 270 from the frame logic 107. This delay is accounted for in the batch command stream execution mode, which will be further described below with reference to FIG. 12.

Figure 11:
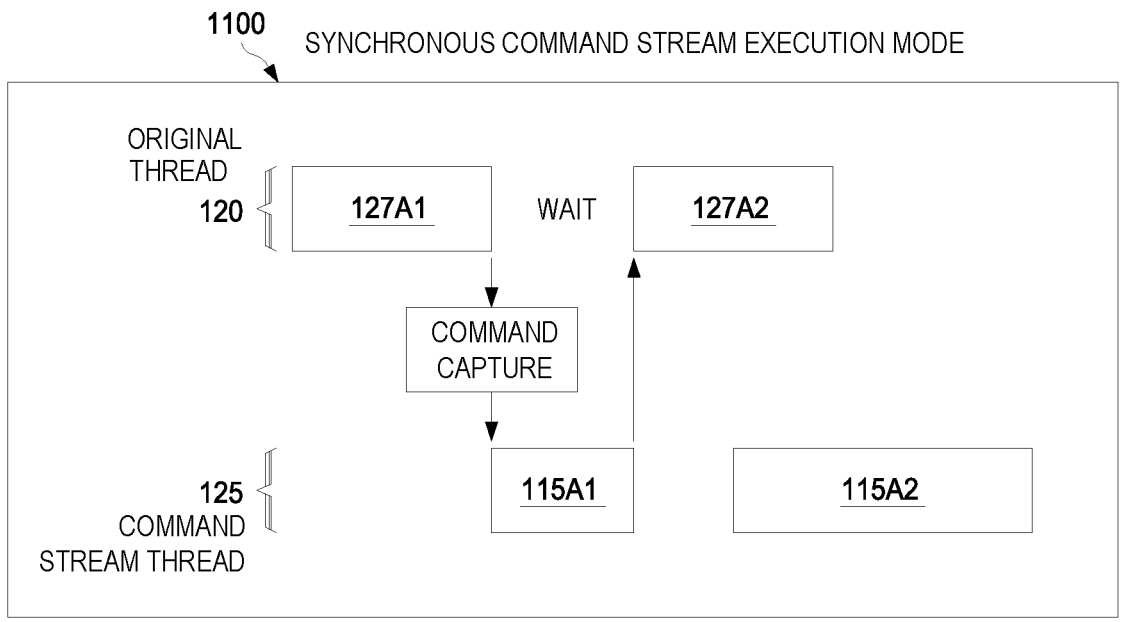
FIG. 11 is a diagram illustrating a synchronous execution mode according to various embodiments of the disclosure.

FIG. 11 is a diagram illustrating a synchronous command stream execution mode 1100 according to various embodiments of the disclosure. The synchronous command stream execution mode 1100 may be used when synchronous commands 611 are selected as being used to process and render a frame 105. As described above, a synchronous command 611 is a command 270 that, when executed, results in a state or outputs data that is subsequently used by the original thread 120. During the time when the synchronous command 611 is executing on the command stream thread 125, the original thread 120 typically waits for a state to be restored or data to be received based on the execution of the synchronous command 611.

For example, void glGenTextures(GLsizei n, GLuint*textures) (GL Textures Command) maybe be an OPEN GL Embedded System (ES) graphics API, which, when called, may be considered a synchronous command 611. The GL Textures Command is an API that generates a set of texture names that are later used by the caller to perform additional graphics. In some cases, the original thread 120 may need to receive the texture names after the command stream thread 125 executes the GL Textures Command. In this case, the original thread 120 may wait for the command stream thread 125 to fully execute the GL Textures Command and receive the texture names from the command stream thread 125 before continuing execution of the original thread 120.

Suppose that in the example shown in FIG. 11, the command stream 115 for rendering a frame 105 is split into portions 115A1 and 115A2 because the command stream portion 115A1 includes a synchronous command 611 at the end of the command stream portion 115A1. Similarly, the game and rendering logic 127 may also be split into two game and rendering logic portions 127A1 and 127A2 because some rendering logic 113 that is part of the game and rendering logic portion 127A1 may be waiting for the synchronous command 611 to restore a state or return an output back to the original thread 120. In many cases, the logic that is split into two portions 127A1 and 127A2 is actually the rendering logic 113 for a frame 105.

As shown by FIG. 11, the original thread 120 may continue to execute the game and rendering logic 127 until the rendering logic 113 begins waiting for the synchronous command 611 to execute. At this point, the command stream thread 125 may retrieve one or more commands 270 and the synchronous command 611 from the command buffer 285 and then execute the commands 270 and the synchronous command 611. After completing execution of the synchronous command 611, the command stream thread 125 may return the state or the data back to the original thread 120 such that the original thread 120 may proceed to execute the second game and rendering logic portion 127A2. As shown by FIG. 11, after the second game and rendering logic portion 127A2 has completed execution, the command stream thread 125 may begin execution of the commands 270 that are used to render the frame 105 in a manner similar to that described above with regard to the deferred command stream execution mode 1000 of FIG. 10.

The original thread 120 may experience one more delays when waiting for data or states from the execution of synchronous commands 611. These delays may be accounted for using various synchronous command handling methods, as will be described below with reference to FIGS. 13 and 14.

Figure 12:
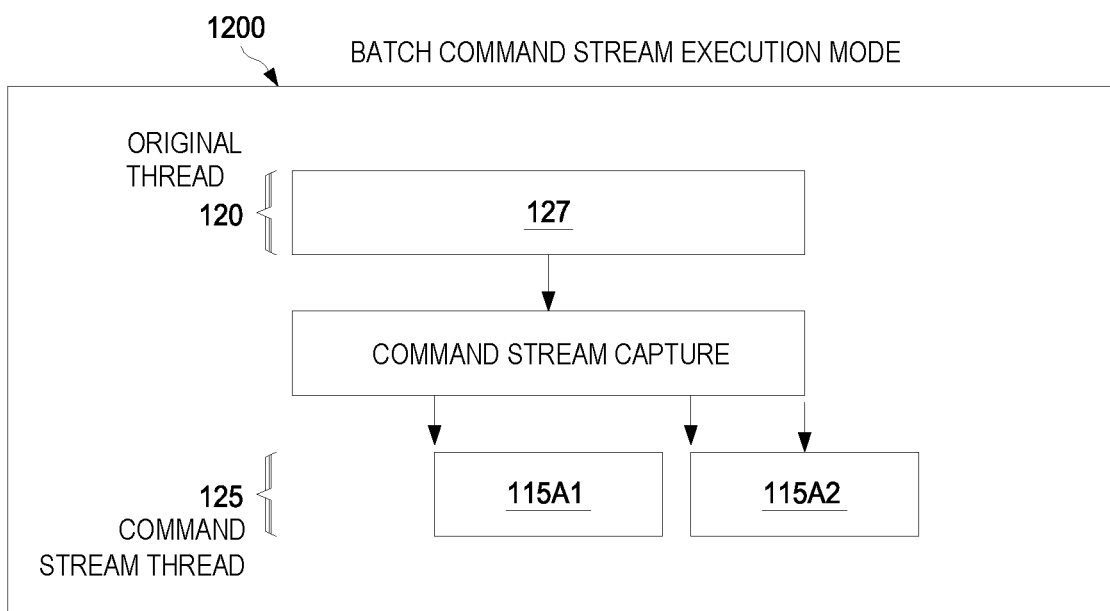
FIG. 12 is a diagram illustrating a batch command stream execution mode according to various embodiments of the disclosure.

FIG. 12 is a diagram illustrating a batch command stream execution mode 1200 according to various embodiments of the disclosure. As discussed above with regard to the deferred command stream execution mode 1000, the deferred command stream execution mode 1000 involves waiting for all of the commands 270 that should be called to render a frame 105 to determined and waiting for all of the game and rendering logic 127 to be executed before the command stream thread 125 begins executing the commands 270 from the command stream 115. Therefore, there is a delay between when the original thread 120 determines all of the commands 270 that should be called to render a frame 105 and when the command stream thread 125 begins executing the commands 270 from the command stream 115.

The batch command stream execution mode 1200 reduces this delay by initiating execution of the commands 270 within the commands stream 115 before completing execution of the game and rendering logic 127 for a frame 107. In an embodiment, a threshold 280 may be pre-configured onto the computing device 200 or 300, where the threshold 280 defines a minimum number of commands 270 that may be captured and stored in the command buffer 285 before the command stream thread 125 begins execution of the commands 270 from the command buffer 285. In an embodiment, the command stream thread 125 may begin execution of the commands 270 from the command buffer 285 after at least a threshold 280 number of commands 270 have been captured from the frame logic 107 and added to the command buffer 285.

As shown by FIG. 12, the batch command stream execution mode 1200 enables the command stream thread 125 to begin execution of the commands 270 much earlier than when the command stream thread 125 would begin executing the commands 270 when implementing the deferred command stream execution mode 1000. In some cases, the command stream thread 125 may execute all of the commands 270 for a frame 105 that are present in the command buffer 285 before the game and rendering logic 127 has completed execution. In this case, the command stream thread 125 may first execute a first portion of the command stream 115A1 and then enter a sleep mode in which the command stream thread 125 again waits for the command buffer 285 to include a threshold 280 number of commands 270. After the command buffer 285 is determined to include at least the threshold 280 number of commands 270, the command stream thread 125 is initiated to begin executing the commands 270 from command buffer 285 that are part of the second portion of the command stream 115A2.

There may be other variations of the batch command stream execution mode 1200 that further reduces the delay that occurs between determining the commands 270 at the original thread 120 and the executing the commands at the command stream thread 125. One such variation may be an adaptive batch command stream execution mode, which is similar to the batch command stream execution mode 1200, except that the threshold 280 may be adjusted according to the types of frames 105 being rendered and/or the types of commands 207 being called for the frame 105. In an embodiment, the threshold 280 may be initially set for a frame 105 based on the number of commands 270 that were used to render a previous frame 105 of the video game. For example, a threshold 280 for the command buffer 285 a for a frame 105B of the video game may be set to be 50% of the number of commands 270 that were used to render the previous frame 105B. In this embodiment, the threshold 280 may be adjusted (e.g., increased or decreased) based on the number of commands 270 used for the rendering of previous frames 105. In some embodiments, there may be a gap between when the original thread 120 finishes a frame 105 and when the command stream thread 125 finishes executing the command stream 115. This gap is defined as the delay. In this adaptive batch command stream execution mode, the threshold 280 may start as 50% of the number of commands 270 used for frame 105A. At the end of rendering frame 105A, the gap may be checked to determine whether the gap (for example, 5 milliseconds) has gotten larger from the gap that occurred when rendering a previous frame (for example, 4 milliseconds). If the gap increased, then the threshold 280 may be decreased to, for example, 40%. The same checks may be performed for the next frame 105B, until the gap is minimized as much as possible. In the opposite direction, when the command stream thread 125 is split up into too many pieces, it may be an indication that the threshold 280 should be made larger in the next frame 105C. By adjusting the threshold dynamically, the gap between the time that the game and rendering logic 127 finishes executing and the time that the command stream 115 finishes executing is minimized.

Another variation of the batch command stream execution mode 1200 may be the tight following batch command stream execution mode. In the tight following batch command stream execution mode, the threshold 280 is essentially set close to one, such that every time a command 270 is added to the command buffer 285, the command stream thread 125 executes that command 270. In an embodiment, the command stream thread 125 may periodically poll the command buffer 285 to determine whether any commands 270 are waiting to be executed for the frame 105 and then subsequently executes the commands 270 in the command buffer 285. In this way, the chance that the command stream thread 125 enters into sleep mode is significantly reduced such that the command stream thread 125 is constantly active. This may ensure that any commands 270 that are determined to be used to render a frame 105 is executed as soon as possible.

In an embodiment, the computing device 200 or 300 may determine whether to use the deferred command stream execution mode 1000, the synchronous command stream execution mode 1100, the batch command stream execution mode 1200, the adaptive batch command stream execution mode, or the tight following command stream execution mode at runtime based on the execution mode that best fits the need for the video game or the frame 105 being rendered. In an embodiment, the computing device 200 or 300 may switch between these execution modes for different frames 105 within the same video game to attain the best balance between accuracy and performance for a video game.

In an embodiment, a fallback mechanism may also be used to essentially turn off any of these execution modes and disable use of the command stream thread 125. In this case, the frames 105 of the video game may be rendered using the single-thread rendering mechanism 103 described with reference to FIG. 1.

Figure 13:
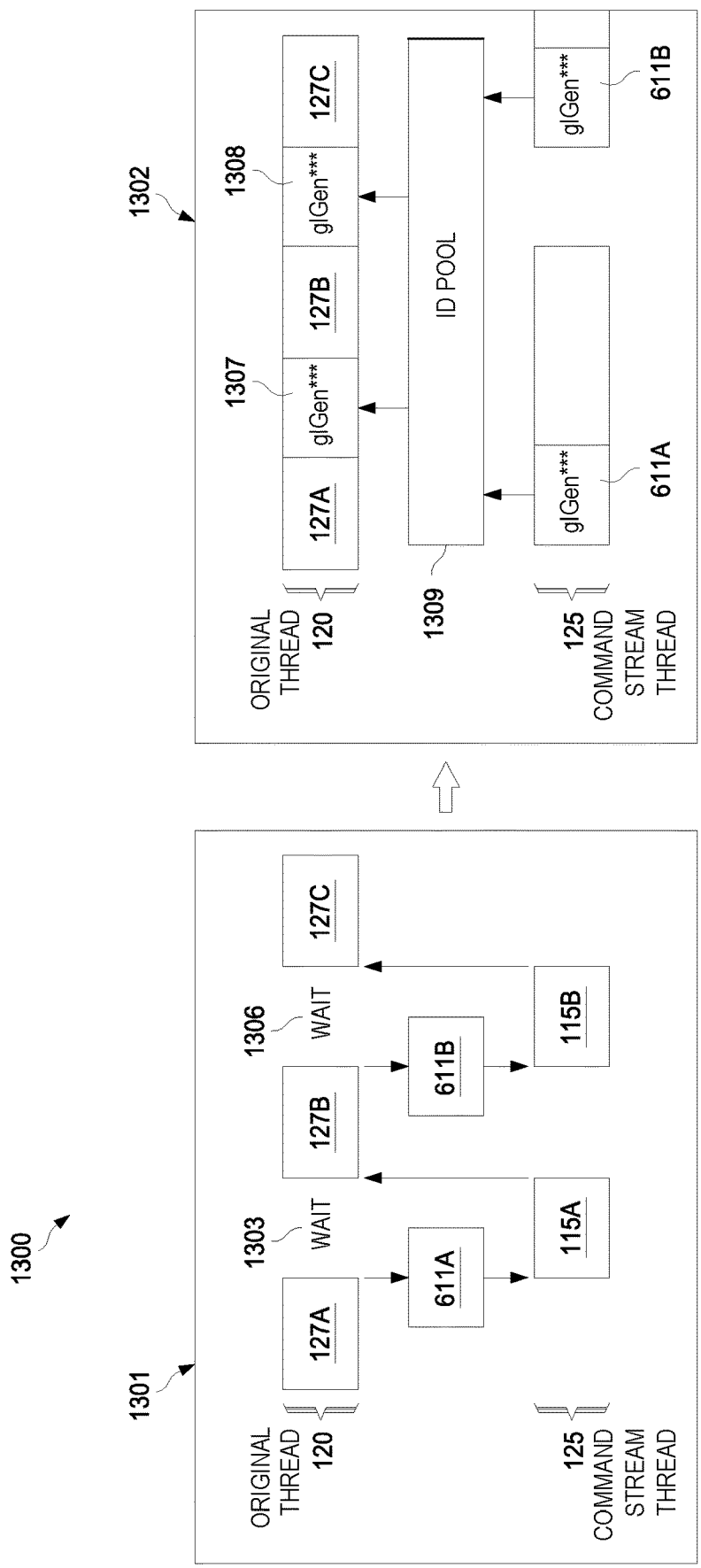
FIG. 13 is a diagram of a batched pre-generation mode of handling of synchronous commands according to various embodiments of the disclosure.

FIG. 13 is a diagram of a batched pre-generation mode 1300 of handling of synchronous commands 611 according to various embodiments of the disclosure. As described above with respect to FIG. 11, synchronous commands 611 may compromise the frame rate of a video by delaying execution of various types of logic on the original thread 120. The batched pre-generation mode 1300 is an example of a mechanism that can be used to minimize the delay that occurs when executing synchronous commands 611.

The batched pre-generation mode 1300 may be applied to synchronous commands 611 that are used to generate handles, such as names or identifiers, on behalf of a video game. Examples of such types of synchronous commands include graphics APIs 330 such as the glGenBuffers, glGenTextures, glCreateProgram, glCreateShader, glMapBuffer, etc. These types of commands are typically called sporadically throughout the process of rendering a frame 105. For example, as shown in box 1301, a synchronous commands 611A-B used to generate handles and may be called twice during the rendering of a single frame 105. The synchronous commands 611A-B may result in original thread 120 having to wait twice (wait 1303 and wait 1306) for the command stream thread 125 to execute the synchronous commands 611A-B and return the generated handles back to the original thread 120. As shown in FIG. 13, the synchronous commands 611A-B may also cause the execution of the game and rendering logic 127 for a frame 105 to be divided into three portions 127A-C.

Box 1302 shows the pre-generation mode 1300 being applied to the frame rendering process for a frame 105 using the synchronous commands 611A-B. As shown by box 1302, instead of sporadically calling the synchronous command 611A-B based on when the original thread 120 identifies that the synchronous command 611 should be called, the pre-generation mode 1300 involves preliminary executing these synchronous commands 611 to pre-generate a large pool 1309 of handles. The pool 1309 of handles can be subsequently used by the original thread 120. The pool 1309 of handles may be stored by the computing device 200 or 300 and may be accessible by the original thread 120 in a manner such that when the original thread 120 determines to call the synchronous command 611A-B, the original thread 120 instead accesses the pool 1309 to retrieve the handle needed at that time.

As shown in box 1302, the command stream thread 125 preliminary executes the synchronous command 611A at a first point in time repeatedly until the pool 1309 of handles is created. Subsequently, the original thread 120 executes game and rendering logic 127 until the original thread 120 determines that a call to a synchronous command 611 should be made. At this point, the original thread 120 may instead receive a handle 1307 from the pool 1309 of handles. In the same way, the original thread 120 may continue to execute the game and rendering logic 127B until the next time that the original thread 120 needs a handle from the pool 1309 of handles. The handle 1308 may be retrieved from the pool 1309 of handles and the original thread 120 may continue execution. Subsequently, for example, when the large pool 1309 has lower than a minimum threshold number of unused handles, the command stream thread 125 may once again preliminary execute the synchronous command 611B at this second point in time to refill the pool 1309 of handles.

While FIG. 13 only shows this batch pre-generation mode 1300 being applied to a synchronous command 611A-B involving the generation of handles, it should be appreciated that the batch pre-generation mode 1300 may be applied to any synchronous command 611A-B that generates identifiers or names that are used by the video game. In addition, it should be appreciated that the command stream 115 may pre-emptively execute the synchronous commands 611A-B at any point in time for any reason, such as based on a pre-determined schedule.

Figure 14:
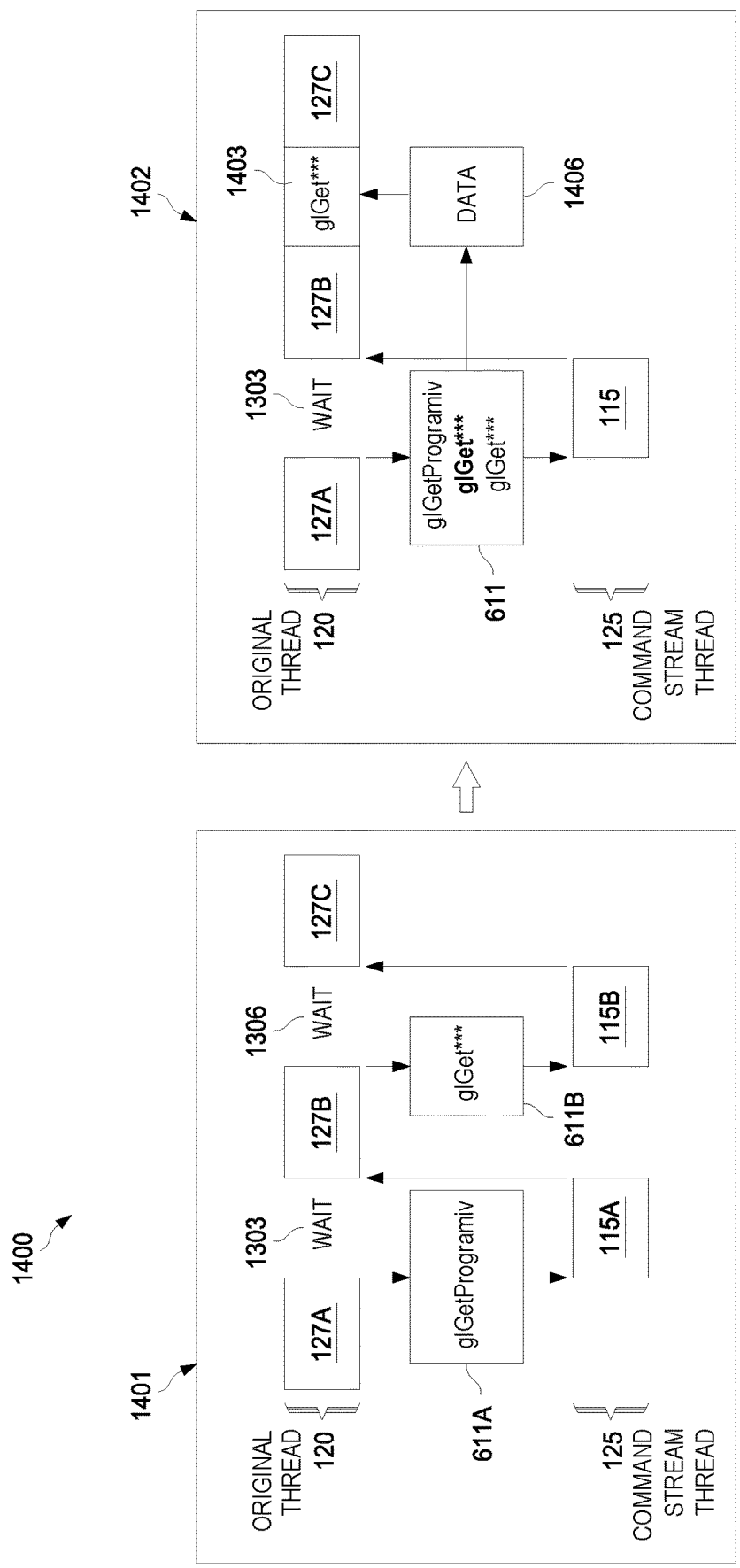
FIG. 14 is a diagram of a batched pre-caching mode for strongly correlated commands of handling of synchronous commands according to various embodiments of the disclosure.

FIG. 14 is a diagram of a batched pre-caching mode 1400 of handling synchronous commands 611 according to various embodiments of the disclosure. The batched pre-caching mode 1400 is similar to the batched pre-generation mode 1300 except that the batched pre-caching mode 1400 is applied to synchronous commands 611 that are correlated with one another and thus are frequently grouped together. Examples of such types of synchronous commands 611 include graphics APIs 330 such as the shader setup APIs glGetProgramiv, glGetProgramBinary, glGetUniformBlockIndex, etc. These types of commands 611 are typically called sporadically throughout the process of rendering a frame 105. Box 1401 is similar to box 1301 in that the synchronous commands 611A-B may result in original thread 120 having to wait twice (wait 1303 and wait 1306) for the command stream thread 125 to execute the synchronous commands 611A-B and return the generated data back to the original thread 120. However, in box 1401, the synchronous command 611A and the synchronous command 611B may be different synchronous commands 611 that are correlated and frequently executed together or grouped together consecutively.

Box 1402 shows the batched pre-caching mode 1400 being applied to the frame rendering process for a frame 105 using the synchronous commands 611A-B. When implementing the batched pre-caching mode 1400, the synchronous commands 611A-B that are typically executed around the same time but separately may instead be grouped together and executed at once so that the original thread only has to wait once (wait 1303) for at least a portion of the data that results from the execution of all the correlated synchronous commands 611A-B. This data may be cached as data 1406 and subsequently accessed by the original thread 120 as needed.

As shown by box 1402, the original thread 120 continues execution of the game and rendering logic 127A until the original thread 120 determines that at least one of the correlated synchronous commands 611A-B should be executed such that data 1406 may be retrieved. At this point, not just the determined synchronous command 611A but also all other related synchronous commands 611A-B may be executed. During this time, the original thread 120 may wait (wait 1303) for the data to be generated based on the execution of the synchronous command 611 and returned. The data that is generated by the execution of all the synchronous commands 611A-B may be cached at the data 1406. The original thread 120 may continue execution of the game and rendering logic 127B until, at 1403, it is again determined that one of these correlated synchronous commands 611A-B should be executed so that data may be retrieved. However, instead of executing the synchronous command 611B again and waiting for the result, the original thread 120 may immediately access the data 1406 to retrieve the data needed to continue execution of the game and rendering logic 127C.

In an embodiment, correlations between synchronous commands may be specific to a video game. For example, commands 270 may follow patterns such that some types of commands 270 are highly likely to happen (e.g., be executed) together. In this way, an analysis may be pre-emptively performed to determine the commands 270 that a game may use to render frames 105 of the game. The commands 270 that are correlated together are the commands 270 that are relevant to the batched pre-caching mode 1400. In this embodiment, these correlations may be identified by the computing device 200 or 300 and such that the batched pre-caching mode 1400 may be applied during rendering of these video games based on the identified correlations between synchronous commands 611.

Other mechanisms may be used to minimize the delay that occurs when executing synchronous commands 611. For example, a batched pre-global caching mode may be used, which is similar to the batched pre-generation mode 1300 and the batched pre-caching mode 1400, except that the batched pre-global caching mode pre-emptively caches many global states, variables, or data, in a cache prior to executing the game and rendering logic 127 or the command stream 115. The cached global states, variables, or data are typically generated by sporadically calling synchronous commands 611. However, the batched pre-global caching mode disclosed herein gathers and stores these global states, variables, and data in a cache so that the synchronous commands 611 do not need to be sporadically called.

Figure 15:
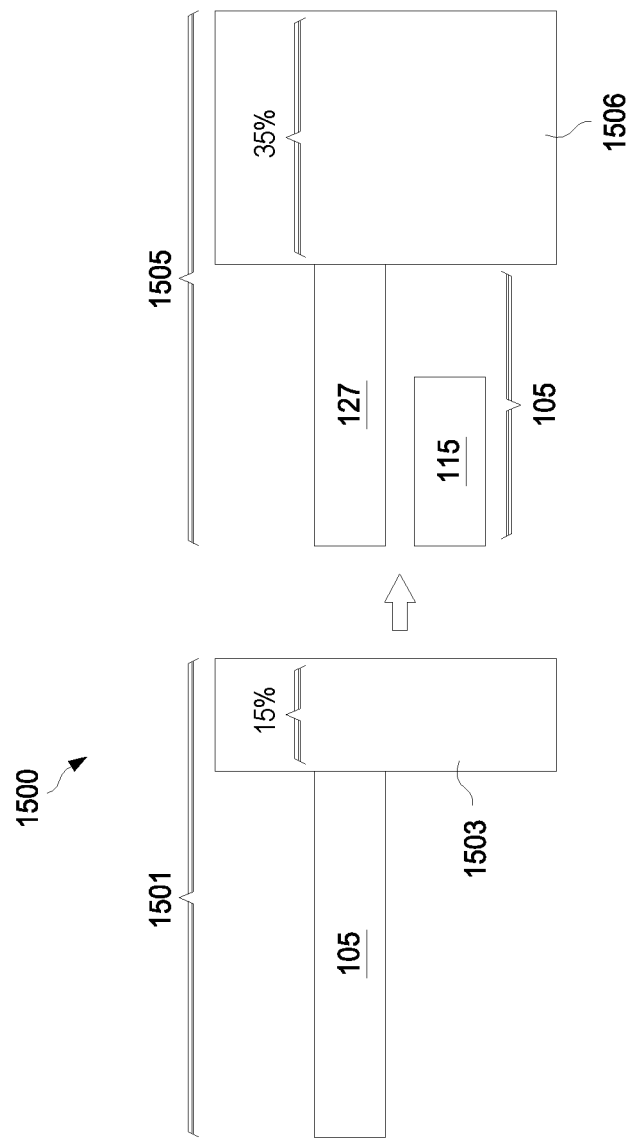
FIG. 15 is a diagram illustrating how the command stream enhancement and optimization techniques disclosed herein improve the frame rate of a video and a power consumption of the video game.

FIG. 15 is a diagram 1500 illustrating how the command stream enhancement and optimization techniques disclosed herein improve the frame rate of a video game and a power consumption of the video game. Typically, as shown by section 1501, when a computing device 200 or 300 uses single-thread rendering 103, the computing device 200 or 300 implements a 15% time gap 1503 after the processing and rendering of each frame 105.

When the computing device 200 or 300 implements the command stream enhancement and optimization techniques disclosed herein using multi-thread rendering 106, the rendering of the frame 105 (e.g., the execution of the game and rendering logic 127 and the command stream 115) is performed faster. Therefore, instead of having a 15% time gap 1503 after the processing and rendering of each frame 105, a 35% time gap 1506 may exist between frames 105 after the processing and rendering of each frame 105. In an embodiment, a frequency machine, such as the DVFS 333, of the CPU 318 may be configured to try to reduce the CPU frequency to return to implementing a 15% time gap 1503 between frames 105. This reduction in CPU frequency additionally results in a reduction of the power consumed by the computing device 200 or 300 while generating the frames.

The embodiments of command stream enhancement and optimization may be used in various different types of situations. For example, the embodiments of command stream enhancement and optimization may be used to reduce redundant commands 270. Some rendering engines are not fully optimized on GL state caches and may have a lot of redundant GL API calls. An internal global GL state cache may be used to eliminate redundant commands 270, which also reduces API invocation overhead.

The embodiments of command stream enhancement and optimization may also be used to transform the commands 270 with equivalent functionality within the command stream 115. For example, a GP API call sequence may be adjusted while maintaining equivalent functionality of the command stream 115. This may reduce state switches and improve execution efficiency on the GPU 321.

The embodiments of command stream enhancement and optimization may also be used is to adjust rendering parameters 810 and memory bandwidth. The organization of frame buffers, texture formats, level of detail of a model, mipmaps, and filter mode of textures may be adjusted. The adjustments may be performed on a per game basis after having evaluated the effects to the visual quality of the frames 105. These adjustments may reduce DDR 323 bandwidth and GPU 321 workload, which improves the performance and power consumption of the computing device 200 or 300 while executing the video game.

Figure 16:
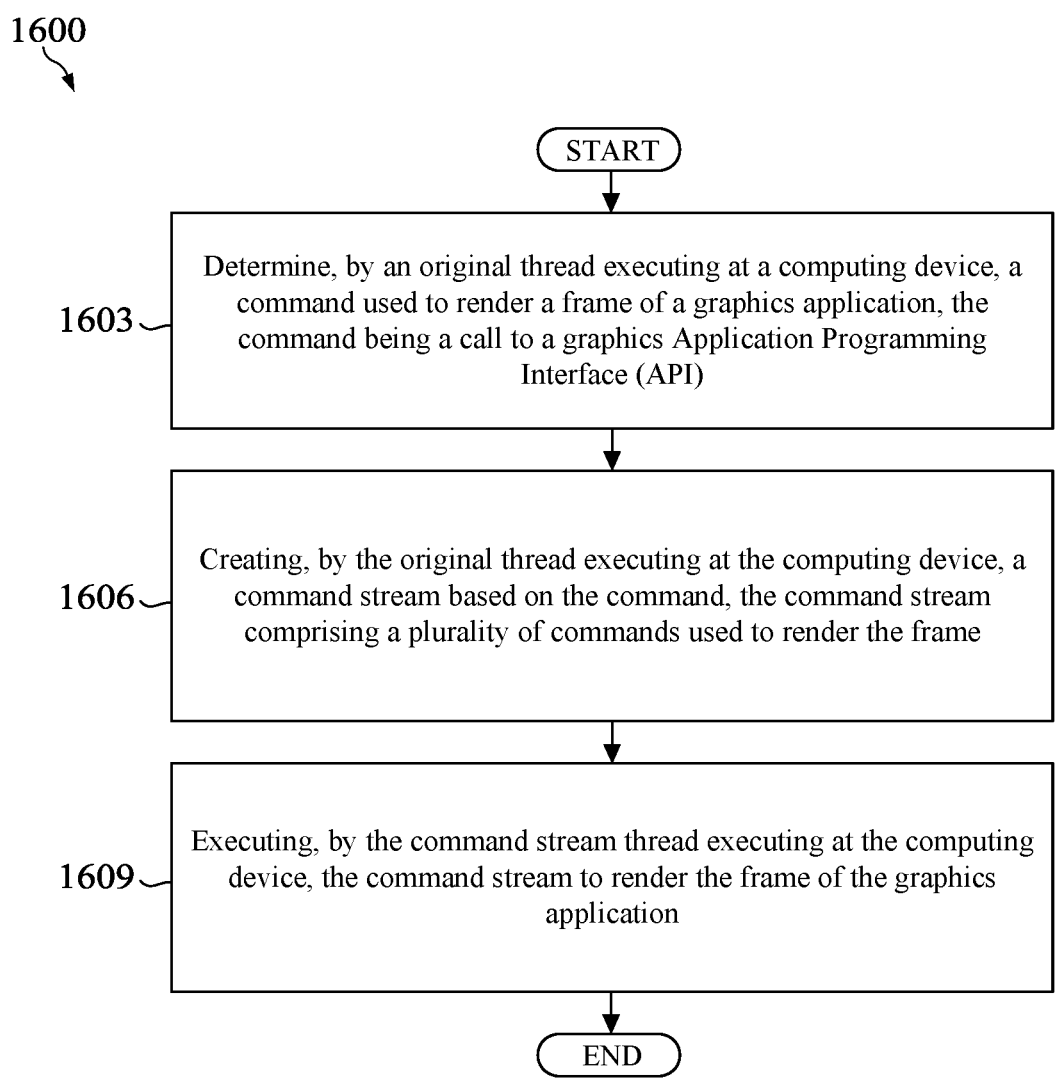
FIG. 16 is a flowchart illustrating a method of command stream optimization and enhancement according to various embodiments disclosed herein.

FIG. 16 is a flowchart illustrating a method 1600 of command stream optimization and enhancement according to various embodiments disclosed herein. Method 1600 may be implemented by the optimization module 235 executed at each of the cores 233, 234, and 237. Method 1600 may be implemented when a frame for a graphics application, such as a video game, needs to be rendered.

At step 1603, a command 270 used to render the frame 105 for the graphics application may be determined. For example, the original thread 120 executing at the first core 233 of the computing device 200 may determine the command 270 used to render the frame 105. The command 270 is a call to a graphics API 330, such as an OPEN GL ES API.

At step 1606, a command stream 115 may be created based on the command 270. The command stream 115 is a plurality of commands 270 used to render the frame 105. The original thread 120 executing at the first core 233 of the computing device 200 may create the command stream 115.

At step 1609, the command stream 115 is executed to render the frame 105 of the graphics application. For example, the command stream thread 125 executing at the second core 234 executes the command stream 115 to render the frame 105.

Figure 17:
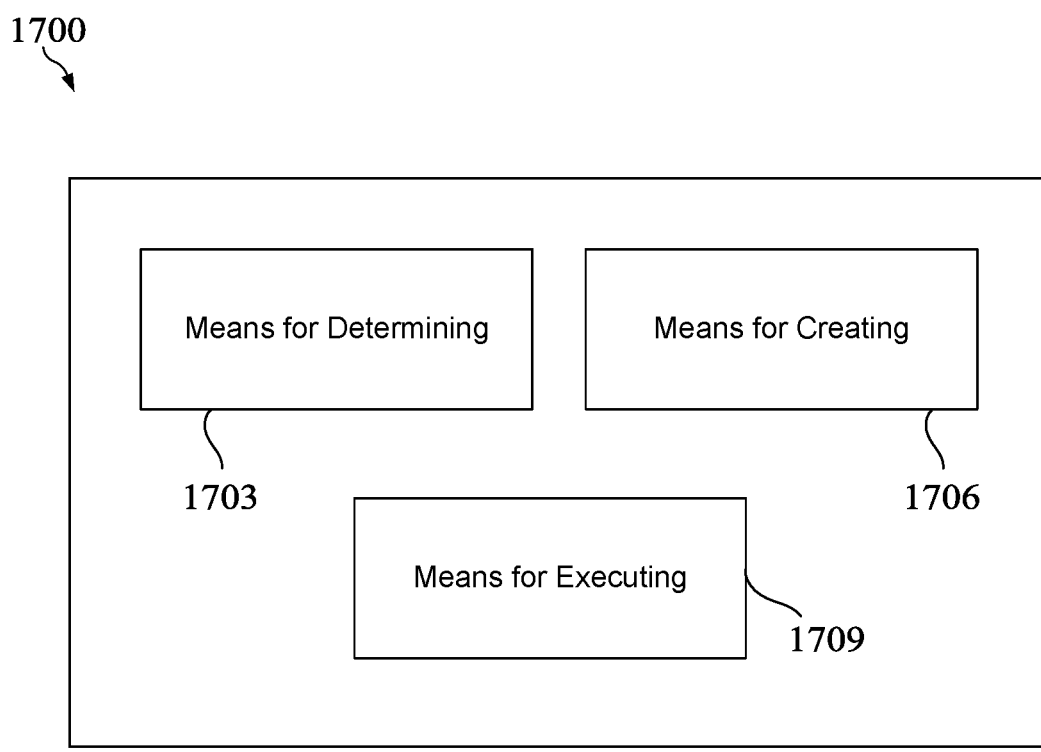
FIG. 17 illustrates an apparatus configured to implement one or more methods described herein.

FIG. 17 illustrates an apparatus 1700 configured to implement one or more methods described herein such as, for example, method 1600. Apparatus 1700 comprises a means for determining 1703, a means for creating 1706, and a means for executing 1709. The means for determining 1706 comprises a means for determining, by an original thread 120, a command 270 used to render a frame 105 of a graphics application, in which the command 270 is a call to a graphics API. The means for creating 1706 comprises a means for creating, by the original thread 120, the command stream 115 based on the command 270, in which the command stream 115 comprises a plurality of commands 270 used to render the frame 105. The means for executing 1709 comprises a means for executing, by the command stream thread 125, the command stream 115 to render the frame 105 of the graphics application.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled may be directly coupled or may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method implemented by a computing device, comprising:
determining, by an original thread executing at the computing device, a command used to render a frame of a graphics application, the command being a call to a graphics interface;
constructing, by the original thread executing at the computing device, a command stream based on the command, the command stream comprising a plurality of commands used to render the frame; and
executing, by a command stream thread executing at the computing device, the command stream to render the frame of the graphics application.

2. The method of claim 1, wherein the command stream is executed by the command stream thread simultaneously with rendering logic executed by the original thread.

3. The method of claim 2, wherein constructing the command stream comprises:
extracting, by the computing device, the plurality of commands from the rendering logic; and
combining, by the computing device, the plurality of commands extracted from the rendering logic.

4. The method of claim 1, wherein an execution of the command stream by the command stream thread is interleaved with an execution of a game logic update and rendering logic by the original thread.

5. The method of claim 1, further comprising:
reinterpreting, by the computing device, a plurality of graphics interfaces corresponding to the plurality of commands in the command stream, the reinterpreting of the plurality of graphics interfaces being customizable and interchangeable during at least one of compile time or runtime on a per application basis;
determining, by the computing device, command stream information comprising graphics data and data dependencies between the plurality of commands in the command stream; and
organizing and storing, by the computing device, the command stream information into a command buffer being stored in a memory of the computing device.

6. The method of claim 1, further comprising retrieving, by the command stream thread restoring and executing at the computing device, the command from the command stream by fetching the command from a command buffer, the command buffer comprising at least one memory block.

7. The method of claim 1, wherein the original thread is executed at a first core of the computing device, and wherein the command stream thread is executed at a second core of the computing device.

8. A computing device, comprising:
a memory comprising a command buffer;
one or more processors coupled to the memory, the one or more processors configured to execute an original thread and a command stream thread, the original thread being configured to:
determine a command used to render a frame of a graphics application, the command being a call to a graphics interface; and
store a command stream at the command buffer, the command stream being constructed based on the command, and the command stream comprising a plurality of commands used to render the frames, and
wherein the command stream thread is configured to execute the command stream to render the frame of the graphics application.

9. The computing device of claim 8, wherein the command is executed by the command stream thread simultaneously with rendering logic executed by the original thread, and wherein the original thread is further configured to:
determine a threshold for the frame that defines a minimum number of commands that are stored in the command buffer before the command stream thread begins execution of the plurality of commands in the command stream; and
execute the plurality of commands in the command stream when a number of commands stored in the command buffer meets the threshold.

10. The computing device of claim 9, wherein the command stream is interleaved with an execution of a game logic update and rendering logic, wherein the threshold for the frame is adjusted based on a number of commands in the command stream for a previous frame of the graphics application and an execution timing of the plurality of commands in the command stream relative to the original thread.

11. The computing device of claim 8, wherein the command buffer is partitioned into a plurality of memory blocks, a first memory block of the plurality of memory blocks storing a handle for the command and a parameter for the command, a second memory block of the plurality of memory blocks storing graphics data used by the command for rendering the frame, wherein the command buffer comprises a memory address of the command, wherein a plurality of implementations may be stored for the command, and wherein one of the implementations may be selected for execution by the command stream thread.

12. The computing device of claim 8, wherein the original thread is further configured to reconstruct one or more of the plurality of commands within the command stream before executing the plurality of commands by changing parameters of the command or removing a redundant command.

13. The computing device of claim 8, wherein the command stream is interleaved with an execution of a game logic update and rendering logic, and wherein the original thread is configured to construct the command stream by:
extract the plurality of commands from the rendering logic, and
combine the plurality of commands extracted from the rendering logic.

14. A computing device, comprising:
an original thread executed by one or more processors at the computing device, the original thread being configured to:
determine a command used to render a frame of a graphics application, the command being a call to a graphics interface; and
construct a command stream based on the command, the command stream comprising a plurality of commands used to render the frame; and
a command stream thread executing by the one or more processors, the command stream thread being configured to execute the command stream to render the frame of the graphics application.

15. The computing device of claim 14, wherein the original thread is further configured to pre-emptively modify the command stream to generate a large pool of handles that are subsequently used by the original thread to execute relevant subsequent commands in an asynchronous manner.

16. The computing device of claim 14, wherein the plurality of commands in the command stream includes one or more synchronous commands that are correlated with one another, and wherein the original thread is further configured to execute a plurality of synchronous commands together at one time.

17. The computing device of claim 14, wherein the original thread is further configured to store the command into a command buffer of a memory of the computing device, wherein the command buffer comprises a memory address of the command.

18. The computing device of claim 14, wherein the command stream is interleaved with an execution of a game logic update and rendering logic, and wherein the original thread is configured to construct the command stream by:

extract the plurality of commands from the rendering logic, and combine the plurality of commands extracted from the rendering logic.

19. The computing device of claim 14, wherein the one or more processors are configured to:

initiate the command stream thread based on at least one of a user command, a configuration file, or detection logic; and terminate the command stream thread based on at least one of a user command, a configuration file, or detection logic.

20. The computing device of claim 14, wherein each of the plurality of commands comprises a call to an interface implemented at a game layer of the computing device or a call to an interface implemented at a device driver of the computing device.

\* \* \* \* \*